(12) United States Patent
Lee et al.

(10) Patent No.: US 10,407,774 B2
(45) Date of Patent: Sep. 10, 2019

(54) METAL-CONTAINING GRAPHENE HYBRID COMPOSITE, AND PREPARING METHOD OF THE SAME

(71) Applicant: RESEARCH & BUSINESS FOUNDATION SUNGKYUNKWAN UNIVERSITY, Suwon-si (KR)

(72) Inventors: Hyoyoung Lee, Suwon-si (KR); Yeoheung Yoon, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 670 days.

(21) Appl. No.: 14/689,544

(22) Filed: Apr. 17, 2015

(65) Prior Publication Data
US 2015/0368804 A1 Dec. 24, 2015

(30) Foreign Application Priority Data

Apr. 17, 2014 (KR) .................. 10-2014-0045830
Apr. 17, 2015 (KR) .................. 10-2015-0054380

(51) Int. Cl.
| | |
|---|---|
| C23C 18/16 | (2006.01) |
| B29B 15/00 | (2006.01) |
| B29C 39/12 | (2006.01) |
| C23C 18/44 | (2006.01) |
| C09D 5/24 | (2006.01) |
| C09D 11/037 | (2014.01) |

(Continued)

(52) U.S. Cl.
CPC .......... *C23C 18/1639* (2013.01); *B29B 15/00* (2013.01); *B29C 39/123* (2013.01); *C01B 32/194* (2017.08); *C09D 5/24* (2013.01); *C09D 11/037* (2013.01); *C09D 11/52* (2013.01); *C23C 18/1646* (2013.01); *C23C 18/1676* (2013.01); *C23C 18/1692* (2013.01); *C23C 18/44* (2013.01); *B29K 2027/16* (2013.01); *B29K 2055/00* (2013.01); *B29K 2995/0005* (2013.01); *B29K 2995/0046* (2013.01); *Y10T 428/31678* (2015.04)

(58) Field of Classification Search
CPC ............ C23C 18/1676; C23C 18/1692; C23C 18/1639; C23C 18/1646; C23C 18/44; C01B 32/194; C09D 5/24; C09D 11/037; C09D 11/52; B29B 15/00; B29C 39/123; B29K 2027/16; B29K 2055/00; B29K 2995/0005; B29K 2995/0046; Y10T 428/31678

See application file for complete search history.

(56) References Cited

FOREIGN PATENT DOCUMENTS

| KR | 10-2011-0073296 A | 6/2011 |
| KR | 10-2011-0110538 A | 10/2011 |

OTHER PUBLICATIONS

Kim, et al., Synthesis of noble metal/graphene nanocomposites without surfactants by one-step reduction of metal salt and graphene oxide, Journal of Colloid and interface Science 2013; 389: 85-90.*

(Continued)

*Primary Examiner* — Daniel C. McCracken
(74) *Attorney, Agent, or Firm* — NSIP Law

(57) ABSTRACT

The present disclosure relates to a metal-containing graphene hybrid composite, a preparing method of the metal-containing graphene hybrid composite, and a preparing method of a metal-containing graphene hybrid film.

8 Claims, 38 Drawing Sheets

(51) Int. Cl.
*C09D 11/52* (2014.01)
*C01B 32/194* (2017.01)
*B29K 27/00* (2006.01)
*B29K 55/00* (2006.01)

(56) References Cited

OTHER PUBLICATIONS

Mitra, et al., Reduction of graphene oxide through a green and metal-free approach using formic acid, Diamond & Related Materials 2013; 37: 74-79.*
Pomogailo, et al., Nanostructured Materials Preparation via Condensation Ways, DOI 10.1007/978-90-481-2567-8-2, pp. 13-89 (2014).*
Bonnemann, et al., Nanoscopic Metal Partciles—Synthetic Methods and Potential Applications, Eur. J. Inorg. Chem. 2001: 2455-2480.*
Kim, Seung-Hyun, et al., "Synthesis of noble metal/graphene nanocomposites without surfactants by one-step reduction of metal salt and graphene oxide" *Journal of Colloid and Interface Science*, vol. 389, 2012 (pp. 85-90).
Li, Nanting, et al. "One-step and rapid synthesis of reduced graphene oxide supported Pt nanodendrites by a microwave-assisted simultaneous reduction." *Materials Research Bulletin* 49 (2014): 119-125. (7 pages, in English).

* cited by examiner

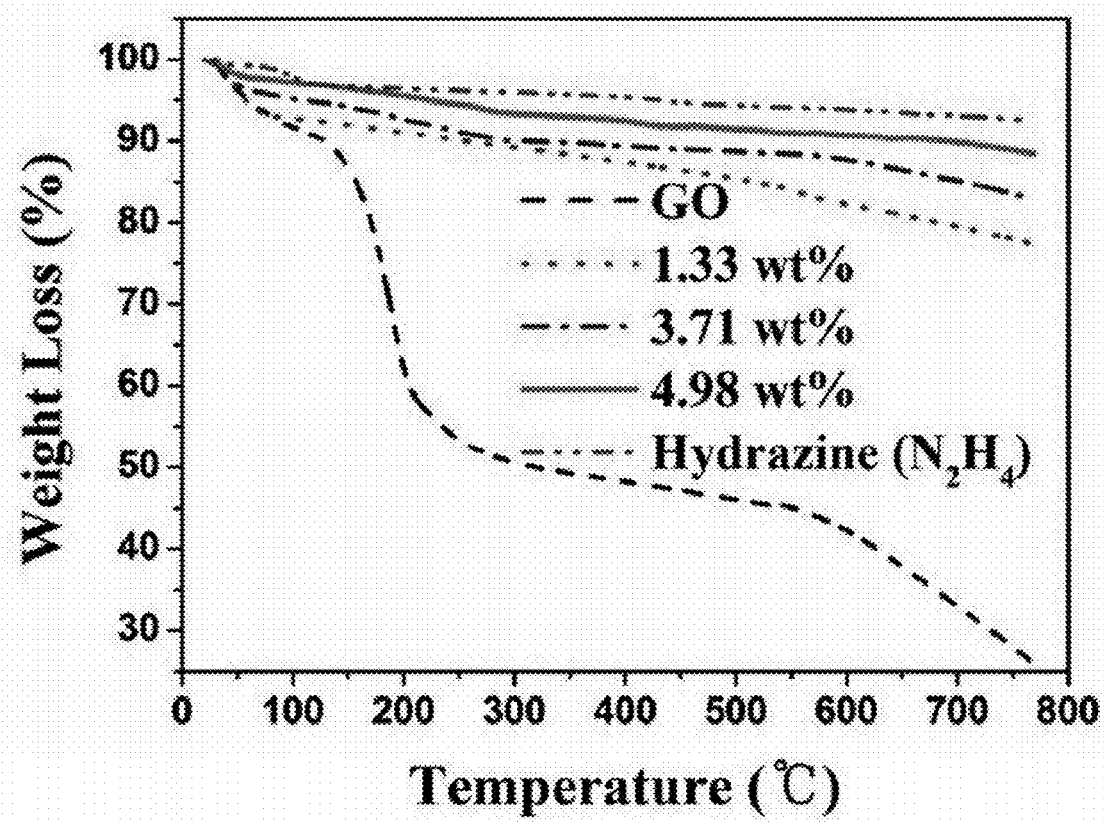

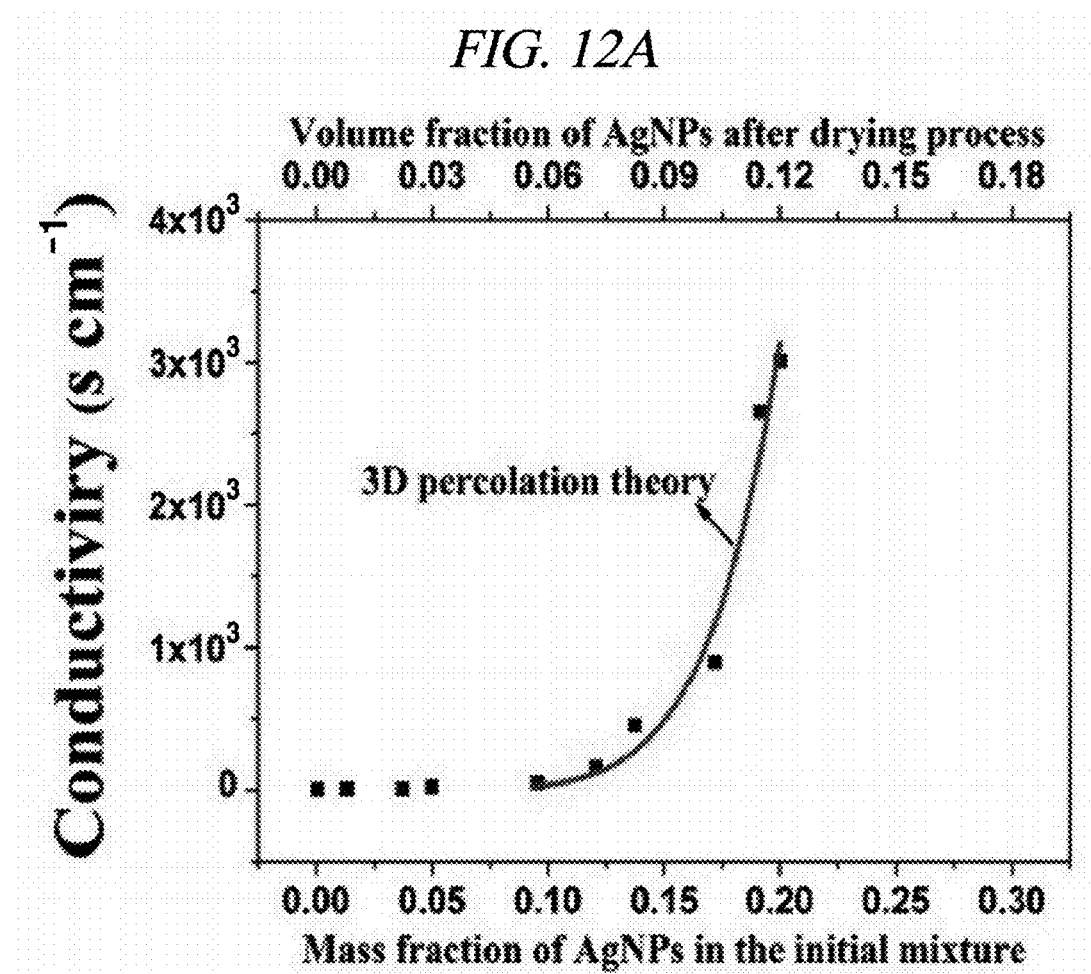

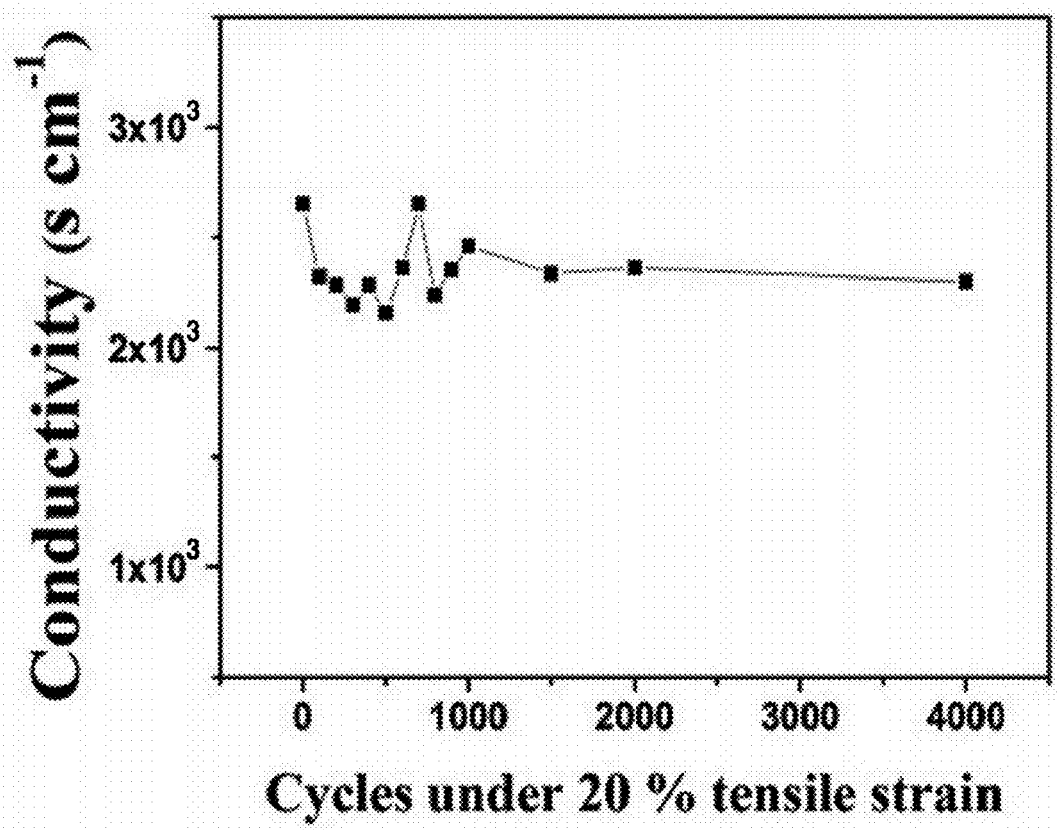

METAL-CONTAINING GRAPHENE HYBRID COMPOSITE, AND PREPARING METHOD OF THE SAME

CROSS-REFERENCE TO RELATED APPLICATION

This application claims the benefit under 35 USC 119(a) of Korean Patent Application No. 10-2014-0045830 filed on Apr. 17, 2014 and Korean Patent Application No. 10-2015-0054380 filed on Apr. 17, 2015, in the Korean Intellectual Property Office, the entire disclosures of which are incorporated herein by reference for all purposes.

TECHNICAL FIELD

The present disclosure relates to a metal-containing graphene hybrid composite, a preparing method of the metal-containing graphene hybrid composite, and a preparing method of a metal-containing graphene hybrid film.

BACKGROUND

Graphene formed of a single layer including $sp^2$-bonded carbon atoms aligned in a typical two-dimensional carbon nano material has attracted extensive attention due to its excellent electrical, mechanical and thermal properties. Not only graphene but also graphene oxide (GO) and reduced graphene oxide (rGO) as graphene derivatives have attracted a lot of attention from various research fields such as sensing, nanoelectronics, energy storage, catalyst, and nanobiotechnology, etc. In recent years, metalworking-processed rGO/composites or nanocompounds have attracted a lot of attention from the academic world due to their optical, electrotechnical, thermal, mechanical, and catalytic properties. The ultimate goal is to prepare compounds or composites by integrating polymers, metal nanoparticles (NP), or nanotubes and fullerene with GO or rGO. Due to a large surface area and the above-described properties, GO has become an attractive substitution as a matrix for nanocompounds.

However, so far, there have been few reports on the use of GO or rGO as a mold for directly synthesizing metal nanoparticles and directly preparing a metal nanoparticle-GO compound on a substrate. Metal nanoparticles are highly important due to their optical, catalytic, electrical, and antibiotic properties. Preparation of metal nanoparticles within a synthesis material has also attracted attention in order to increase their properties and applicability. Therefore, integration of GO or rGO with metal nanoparticles or synthesis of metal nanoparticles using GO or rGO as a mold is a major purpose of research. Muszynski et al. synthesized gold (Au) nanoparticles using chemical reduction of $NaBH_4$ and $HAuCl_4$. In this synthesis, a graphene-octadecylamine suspension in THF was used and metal borohydride was used as a reducing agent. However, such a process is not an environment-friendly process. Further, gold nanoparticles were just anchored on graphene functionalized with octadecylamine but not directly anchored on a surface of the graphene. Recently, Nanda et al. synthesized M@rGO using zinc and $H_2SO_4$. In this synthesis, powder of a metal (Zn) was used to prepare nanoparticles of another metal. A high concentration of $H_2SO_4$ (10 M) was needed to prepare small metal nanoparticles, and when a low concentration was used, large nanoparticles (50 nm) were obtained. However, in this method, a material which is not suitable to be used as a conductive material in a transparent conductive electrode was produced.

Further, conventionally, there was an attempt to perform electrical deposition in order to prepare a composite by integration of GO or rGO with metal nanoparticles. Korean Patent Laid-open Publication No. 10-2011-0110538 (published on Oct. 7, 2011, entitled "Nanostructured film on the graphene by electrochemistry") may be one of examples.

SUMMARY

In view of the foregoing, the present disclosure provides a metal-containing graphene hybrid composite, a preparing method of the metal-containing graphene hybrid composite, and a preparing method of a metal-containing graphene hybrid film.

However, problems to be solved by the present disclosure are not limited to the above-described problems. Although not described herein, other problems to be solved by the present disclosure can be clearly understood by those skilled in the art from the following descriptions.

In a first aspect of the present disclosure, there is provided a preparing method of a metal-containing graphene hybrid composite, including: mixing an acid solution, a metal salt containing a metal ion, and graphene oxide to reduce the metal ion and the graphene oxide; and depositing the reduced metal ion on the reduced graphene oxide.

In a second aspect of the present disclosure, there is provided a metal-containing graphene hybrid composite prepared by the method according to the first aspect of the present disclosure and containing reduced graphene oxide on which metal nanoparticles are deposited.

In a third aspect of the present disclosure, there is provided a preparing method of a metal-containing graphene hybrid film, including: printing a solution containing a mixture of the metal-containing graphene hybrid composite according to the second aspect of the present disclosure and a polymer on a substrate; dropping a chemical elastomer polymer on the printed substrate; drying and hardening the substrate on which the chemical elastomer polymer is dropped to form a film on the substrate; and separating the film from the substrate.

In an exemplary embodiment of the present disclosure, there is provided a novel, convenient, and economical method for preparing a metal-containing graphene hybrid composite in-situ using duality of a formic acid at a low temperature. Further, reduction duality of a formic acid in accordance with an exemplary embodiment of the present disclosure enables graphene oxide (GO) to be reduced to reduced graphene oxide (rGO) and cationic metal ions to be deposited in the form of metal nanoparticles on the rGO at the same time. During this process, the formic acid is converted into a $CO_2$ gas to be discharged. Therefore, the preparing method of the present disclosure is advantageous in that it is an environment-friendly method without generation and discharge of harmful substances.

A metal-containing graphene hybrid film in accordance with an exemplary embodiment of the present disclosure can be used to prepare highly conductive and highly elastic electrodes having a high conductivity of 3,012 S/cm and 322.8 S/cm at a strain of 35% using a metal-immersion rGO ink which can be printed on a substrate provided with a high elasticity through an immersion process of a chemical elastomer polymer.

Further, metal-containing graphene hybrid composite and film in accordance with an exemplary embodiment of the present disclosure can be used for various purposes in various industrial fields such as graphene-based conductive inks for a transparent electrode including a large-area flexible displays, solar cells, optical/electrotechnical biosensors, energy nano generators, transparent energy storage devices as charge collectors, and other modern nanoelectronics, and particularly, can be used as a transparent conductive electrode.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 2F illustrates a TGA thermogram of GO and rGO-AgNP hybrid materials in accordance with an Example of the present disclosure.

FIG. 12D provides an image showing a crumpling test.

DETAILED DESCRIPTION

Figure 1:
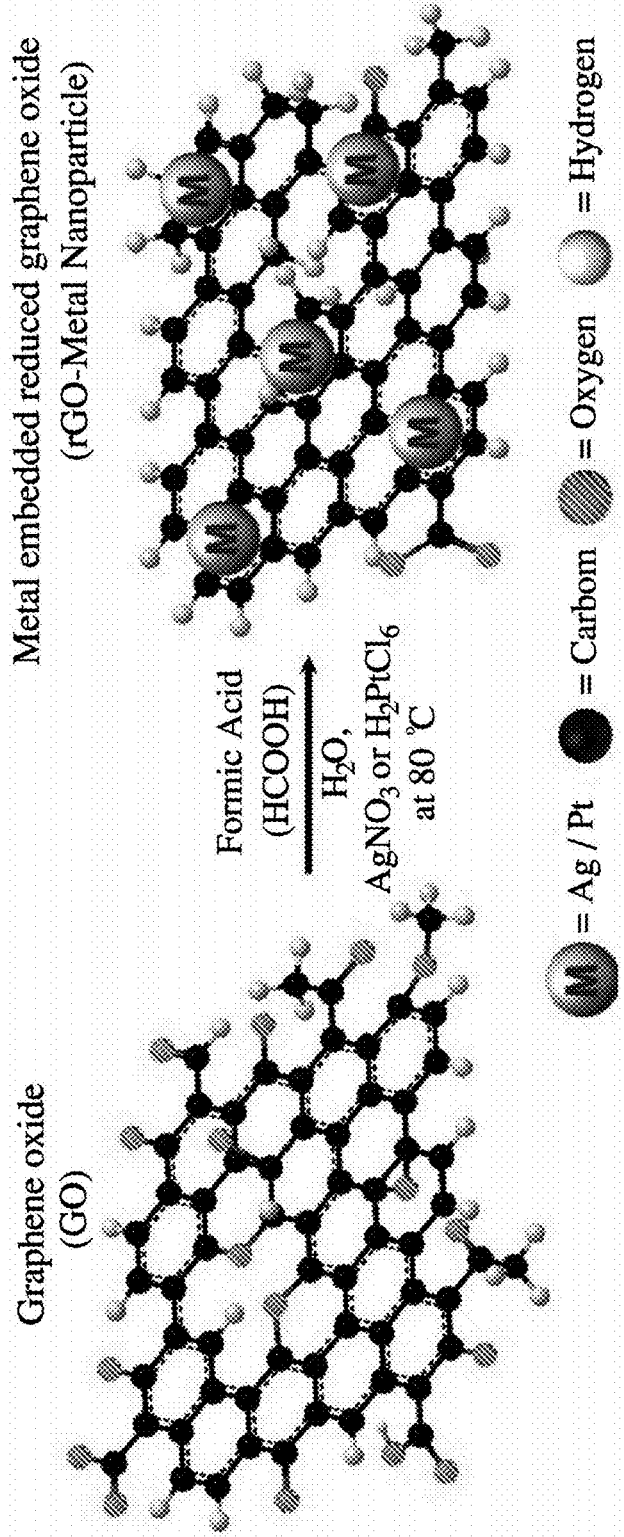
FIG. 1 is a schematic diagram illustrating a preparing method of a metal-containing graphene hybrid composite in accordance with an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "graphene" refers to a material forming a polycyclic aromatic molecule with multiple carbon atoms covalently bonded to each other. The covalently bonded carbon atoms forms a six-member ring as a repeating unit, but can further include a five-member ring and/or a seven-member ring. Therefore, a sheet formed of the graphene may be seen as a single layer of carbon atoms covalently bonded to each other, but may not be limited thereto. The sheet formed of the graphene may have various structures depending on a content of five-member ring and/or a seven-member ring which may be contained in the graphene. Further, if the sheet formed of the graphene is formed into a single layer, such a single layer may be stacked to form multiple layers and a side end portion of the graphene sheet may be saturated with a hydrogen atom, but may not be limited thereto.

Through the whole document, the term "graphene oxide" may be abbreviated as "GO", and may include a structure in which a functional group containing oxygen such as a carboxyl group, a hydroxyl group, or an epoxy group is bonded to a single layer of graphene, but may not be limited thereto.

Through the whole document, the term "reduced graphene oxide" refers to graphene oxide decreased in a percentage of oxygen through a reduction process and may be abbreviated as "rGO", but may not be limited thereto.

Through the whole document, the term "nanoparticle" refers to a nanoscale material without limitation to a specific shape, and may be abbreviated as "NP". It may be named as being related to a specific metal, which may include precious metals or transition metals, and may be abbreviated as, for non-limited example, "AgNP (silver nanoparticle)", "PtNP (platinum nanoparticle)", etc., but may not be limited thereto.

Hereinafter, example embodiments and examples of the present disclosure will be explained in detail with reference to the accompanying drawings. However, the present disclosure may not be limited to these example embodiments, examples, and drawings.

In a first aspect of the present disclosure, there is provided a preparing method of a metal-containing graphene hybrid composite, including: mixing an acid solution, a metal salt containing a metal ion, and graphene oxide to reduce the metal ion and the graphene oxide; and depositing the reduced metal ion on the reduced graphene oxide. To be specific, there is provided a preparing method of a metal-containing graphene hybrid composite, including: mixing an acid solution, a metal salt containing a metal ion, and graphene oxide (GO); and reducing the graphene oxide to reduced graphene oxide (rGO) with the formic acid at the same time when the metal ion is reduced to a metal, so that a metal nanoparticle (metal-NP) is formed.

In an exemplary embodiment, the acid solution may include an acid selected from the group consisting of formic acid, acetic acid, amino acid, oleic acid, citric acid, a keto acid, and combinations thereof, but may not be limited thereto.

In an exemplary embodiment, the metal or metal ion may include precious metals or transition metals, or cations thereof, but may not be limited thereto. By way of example, the metal or metal cation may include silver, platinum, palladium, rhodium, gold, or cations thereof, but may not be limited thereto.

By way of example, in the preparing method of a metal-containing graphene hybrid composite in accordance with an exemplary embodiment of the present invention, graphene oxide (GO), an acid solution, a metal salt containing a metal ion are mixed, so that the metal ion is reduced to a metal with the formic acid and a metal nanoparticle is formed at the same time when the graphene oxide is reduced to reduced graphene oxide, and the metal nanoparticle may be immersed in the reduced graphene oxide.

In an exemplary embodiment, the metal salt containing the metal ion may contain a cation of a precious metal or transition metal, and may be selected from the group consisting of, for example, nitrate salt, carbonate salt, acetate salt, chloride salt, sulfate salt, phosphate salt, halide salt, and combinations thereof, but may not be limited thereto.

In an exemplary embodiment, the reduced metal ion may be deposited in the form of metal nanoparticles on the reduced graphene oxide, but may not be limited thereto.

In an exemplary embodiment, a content of the metal nanoparticle in the composite may be adjusted by adjusting a concentration of the metal salt, but may not be limited thereto.

In an exemplary embodiment, a reduction process of the acid solution is initiated by the metal salt, but may not be limited thereto.

In an exemplary embodiment, a heating step may be further included after the depositing step, but the present exemplary embodiment may not be limited thereto.

In an exemplary embodiment, the acid solution may have duality, and the duality of the acid solution may refer to functions that enable graphene oxide to be reduced to reduced graphene oxide and cationic metal ions to be deposited in the form of metal nanoparticles on the reduced graphene oxide through a reduction process at the same time, i.e., two functions of the acid solution simultaneously performed in relation to reduction, but may not be limited thereto. By way of example, if a formic acid is used as the acid solution, duality or reduction duality of the formic acid can be represented by a mechanism as shown in the following formula (1), but may not be limited thereto:

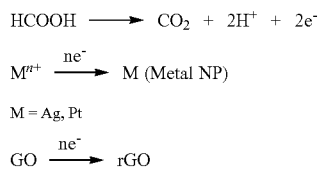

$$HCOOH \longrightarrow CO_2 + 2H^+ + 2e^-$$ Formula (1)

$$M^{n+} \xrightarrow{ne^-} M \text{ (Metal NP)}$$

M = Ag, Pt $$GO \xrightarrow{ne^-} rGO$$

In an exemplary embodiment, in the preparing method of a metal-containing graphene hybrid composite in accordance with the first aspect of the present disclosure, the metal-containing graphene hybrid composite is prepared in-situ using reduction duality of the acid solution in the presence of the metal salt formed of the same metal as the metal nanoparticle, but may not be limited thereto. By way of example, if the metal nanoparticle is a silver nanoparticle (AgNP), the metal salt may be $AgNO_3$, but may not be limited thereto. The metal salt such as $AgNO_3$ serves as a source of the metal nanoparticle and also serves as an initiator of a reduction process, but may not be limited thereto.

By way of example, when the metal-containing graphene hybrid composite is prepared, if the acid solution and the metal salt are separately applied, i.e., if any one of the acid solution and the metal salt is applied, the metal-containing graphene hybrid composite may not be successfully prepared. This is because only when the metal salt is added in an amount greater than a promoting amount, the metal salt can serve as an initiator of a reduction process and the reduction process can be started, and only when the reduction process is started, the graphene oxide can be reduced to the reduced graphene oxide and the cationic metal ion can be deposited in the form of a metal nanoparticle on the reduced graphene oxide through the reduction process, so that the metal-containing graphene hybrid composite can be prepared.

FIG. 1 is a schematic diagram illustrating a preparing method of a metal-containing graphene hybrid composite in accordance with an exemplary embodiment of the present disclosure. Referring to FIG. 1, if the metal-containing graphene hybrid composite is a reduced graphene oxide composite in which a silver nanoparticle (AgNP) is immersed, a formic acid may be used as the acid solution and $AgNO_3$ may be used as the metal salt, and if the metal-containing graphene hybrid composite is a reduced graphene oxide composite in which a platinum nanoparticle (PtNP) is immersed, $H_2PtCl_6$ may be used as the metal salt, but may not be limited thereto.

In a second aspect of the present disclosure, there is provided a metal-containing graphene hybrid composite prepared by the method according to the first aspect of the present disclosure and containing reduced graphene oxide on which metal nanoparticles are deposited. Detailed description of the same parts as the first aspect of the present disclosure will be omitted, but the description of the first aspect of the present disclosure can be equally applied to the second aspect although omitted hereinafter.

A metal-containing graphene hybrid film in accordance with an exemplary embodiment of the present disclosure can be applied to graphene-based conductive inks for a transparent electrode including a large-area flexible displays, solar cells, optical/electrotechnical biosensors, energy nano generators, transparent energy storage devices as charge collectors, and other modern nanoelectronics, but may not be limited thereto.

In a third aspect of the present disclosure, there is provided a preparing method of a metal-containing graphene hybrid film, including: printing a solution containing a mixture of the metal-containing graphene hybrid composite according to the second aspect of the present disclosure and a polymer on a substrate; dropping a chemical elastomer polymer on the printed substrate; drying and hardening the substrate on which the chemical elastomer polymer is dropped to form a film on the substrate; and separating the film from the substrate.

In the preparing method of a metal-containing graphene hybrid film in accordance with an exemplary embodiment of the present disclosure, a solution containing a mixture of the metal-containing graphene hybrid composite of the second aspect and a polymer is ultrasonicated and printed on a substrate, a chemical elastomer polymer solution is dropped on the printed substrate, a film is formed on the substrate by drying and hardening the substrate, and the film is separated from the substrate. By way of example, the printing process may be performed by using a doctor blade method, but may not be limited thereto.

In an exemplary embodiment, the polymer may be selected from the group consisting of polyvinylidene fluoride, methylene glucose, ethylene glucose, and combinations thereof, but may not be limited thereto.

In an exemplary embodiment, the chemical elastomer polymer may be selected from the group consisting of a nitrile butadiene rubber, a polyisoprene rubber, a polybutadiene rubber, a chloroprene, a polychloroprene, a neoprene rubber, a styrene butadiene rubber, a nitrile rubber, and combinations thereof, but may not be limited thereto.

In an exemplary embodiment, compressing the film by a hot-roll pressing process may be further included after the film is separated from the substrate, but may not be limited thereto.

In an exemplary embodiment, the hot-roll pressing process may be performed at from about 30° C. to about 200° C., but may not be limited thereto. By way of example, the hot-roll pressing process may be performed at from about 30° C. to about 200° C., from about 30° C. to about 180° C., from about 30° C. to about 160° C., from about 30° C. to about 140° C., from about 30° C. to about 120° C., from about 30° C. to about 100° C., from about 30° C. to about 80° C., from about 30° C. to about 60° C., from about 30° C. to about 40° C., from about 40° C. to about 200° C., from about 60° C. to about 200° C., from about 80° C. to about 200° C., from about 100° C. to about 200° C., from about 120° C. to about 200° C., from about 140° C. to about 200° C., from about 160° C. to about 200° C., or from about 180° C. to about 200° C., but may not be limited thereto.

Hereinafter, an Example of the present disclosure will be explained in more detail. However, the present disclosure may not be limited thereto.

EXAMPLE

1. Materials and Apparatuses for Experiment

In the present Example, natural graphite (Bay Carbon, SP-1 graphite), sulfuric acid (95 to 97%), hydrogen peroxide (30 wt %), potassium permanganate, sodium nitrate, silver nitrate, and formic acid were commercial materials and used as purchased.

Further, apparatuses used for analysis of properties of a composite prepared in the present Example were as follows: Raman spectroscopy measurement was carried out using a micro-Raman system (Renishaw, RM1000-In Via) at excitation energy of 2.41 eV (514 nm); all X-ray photoelectron spectroscopy measurements were carried out at 100 W using a sigma probe (ThermoVG, made in England) as a monochrome Al-Ka X-ray source; power X-ray diffraction was studied using Cu-Ka radiation and a D8-Adcance (made in Germany); thermal characteristics of rGO-AgNP were measured by a TGA (Polymer laboratory, TGA 1000 plus); microstructures were observed using a field emission type scanning electron microscope (FESEM, JSM-6701F/INCA Energy, JEOL) and a transmission electron microscopy (TEM, JEOL JEM 3010); AFM was measured at room temperature using a SPI-3800 controller (Seiko Instrument Industry Co.) and a SPA400; FT-IR spectra were measured using a Thermo Nicolet AVATAR 320; conductivity of the hybrid film was measured under various tensile strains by a Hall-effect measurement system (HMS-3000, ECOPIA); and elasticity of a rGO-AgNP hybrid film was measured using a manufactured stretching tester.

2. Preparation of Metal-Containing Graphene Composite (rGO-AgNP and rGO-PtNP)

GO was dispersed in deionized water (40 mL, 2 mg mL-1), and 1 mL to 2 mL of a formic acid and $AgNO_3$ in a promoting amount (5 mg) were added thereto (to prepare 1.33 wt % AgNP from a rGO-AgNP hybrid material). The reactant mixture was heated at 80° C. for 6 hours with stirring, and then, filtered and washed several times with deionized water. Then, an excess of the formic acid was washed with saturated sodium bicarbonate solution and then washed several times with deionized water. Thereafter, the resultant product was dried in a vacuum for 24 hours at 60° C., so that a rGO-AgNP hybrid material was obtained. With various concentrations of $AgNO_3$, various rGO-AgNP containing AgNP in different amounts were synthesized. This protocol was equally applied to synthesis of rGO-PtNP using chloroplatinic acid ($H_2PtCl_6$).

3. Preparation of Elastic and Conductive rGO-AgNP Hybrid Film

The rGO-AgNP hybrid material (100 mg) prepared in Example was ground with polyvinylidene fluoride (PVDF) (100 μL of a 10 wt % PVDF solution in NMP) in a mortar for 30 minutes, and ultrasonicated for 60 minutes to be uniformly prepared. In the next step, the prepared rGO-AgNP ink was printed on a substrate such as PET or glass using a doctor blade method. Then, the coated rGO-AgNP film was dried on the substrate (for 12 hours under atmospheric conditions and for 60 minutes at 100° C.). In order to prepare an elastic rGO-AgNP hybrid film, a chemical elastomer polymer solution was dropped on the prepared rGO-AgNP film and dried at room temperature for 24 hours and hardened at 150° C. for 90 minutes. A rGO-AgNP hybrid film was separated from the substrate, and then, the rGO-AgNP hybrid film was compressed at 150° C. for several seconds using a hot-roll pressing apparatus. A final size of the film was 40×5×0.03 mm.

Figure 2A:
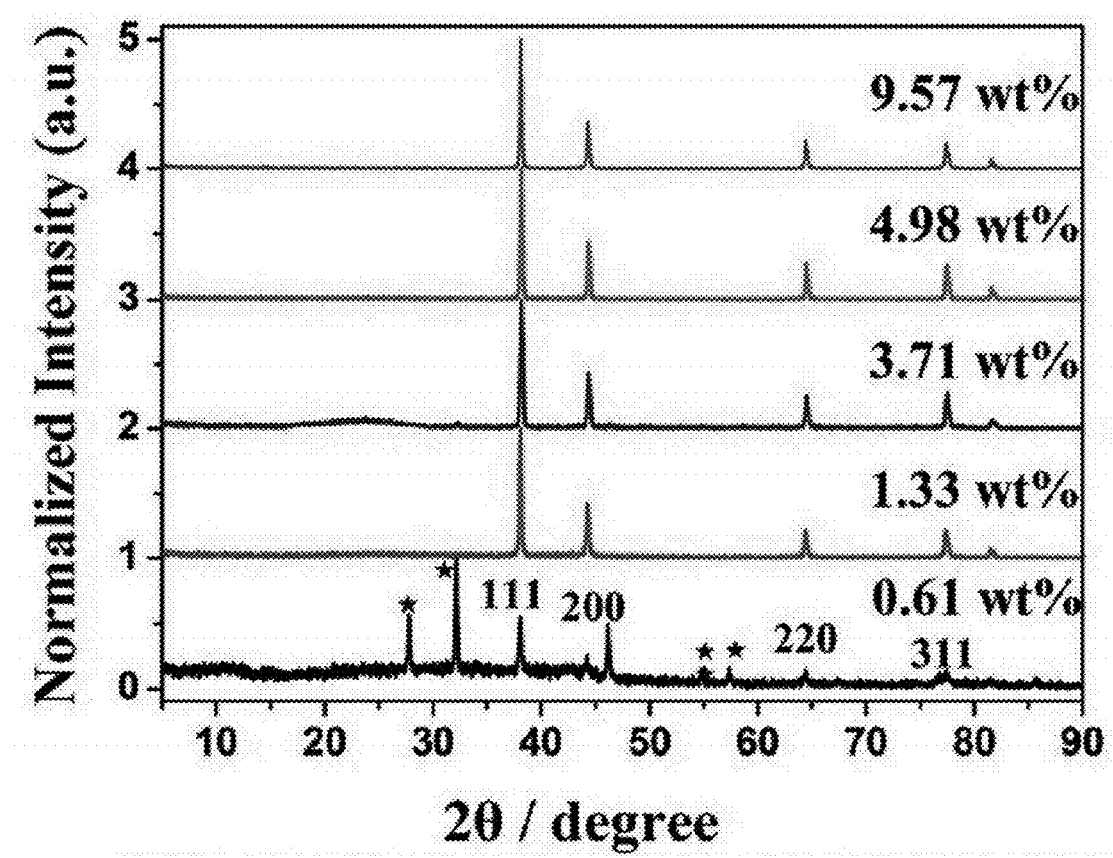
FIG. 2A illustrates XRD patterns of amounts of AgNP depending on rGO-AgNP and rGO-PtNP.
Figure 2B:
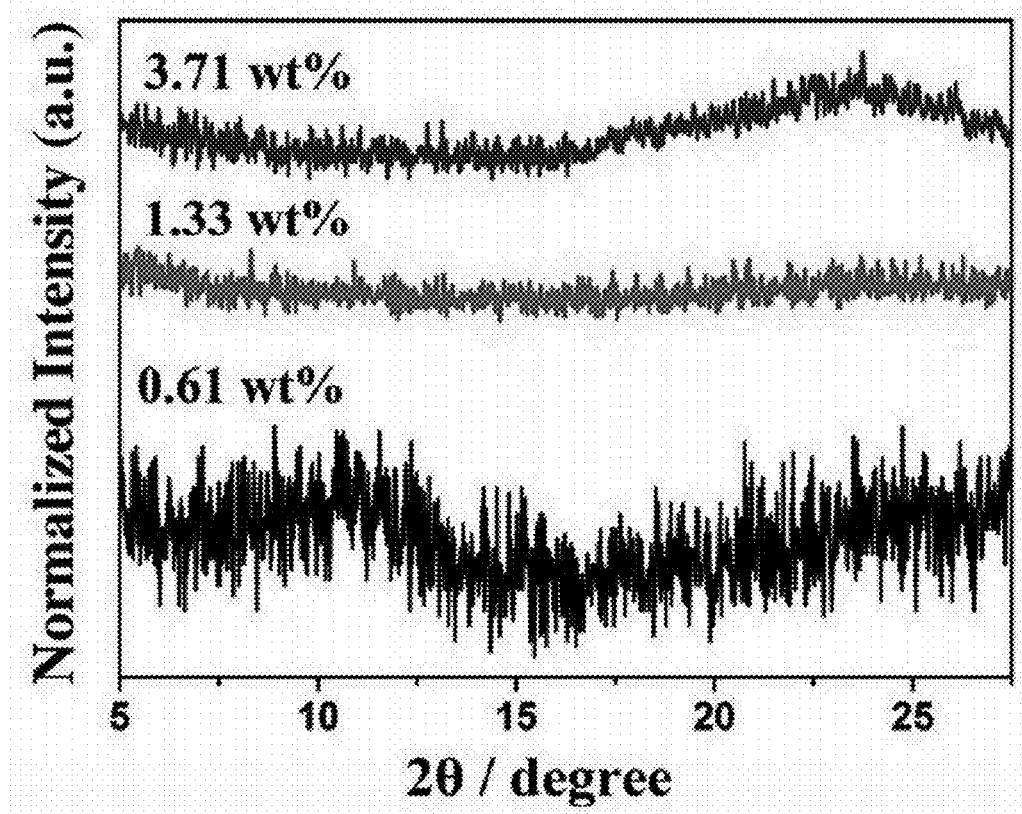
FIG. 2B illustrates XRD patterns of amounts of AgNP depending on rGO-AgNP and rGO-PtNP.
Figure 2C:
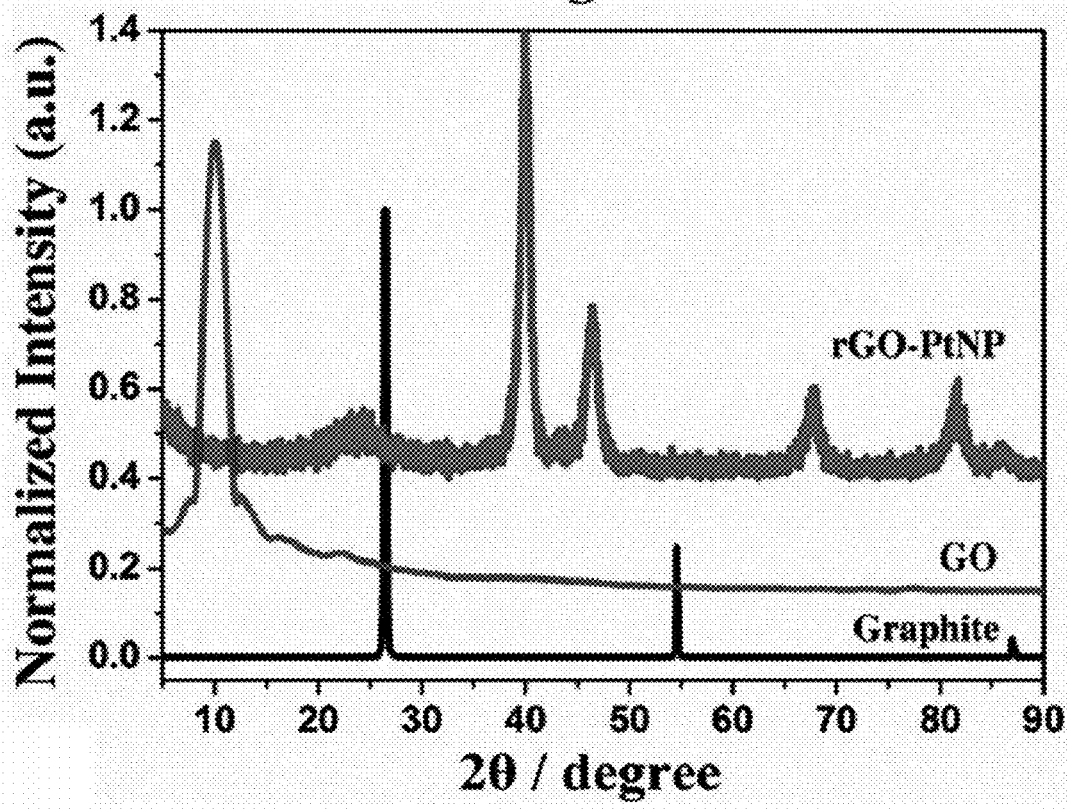
FIG. 2C illustrates XRD patterns of amounts of AgNP depending on rGO-AgNP and rGO-PtNP.
Figure 2D:
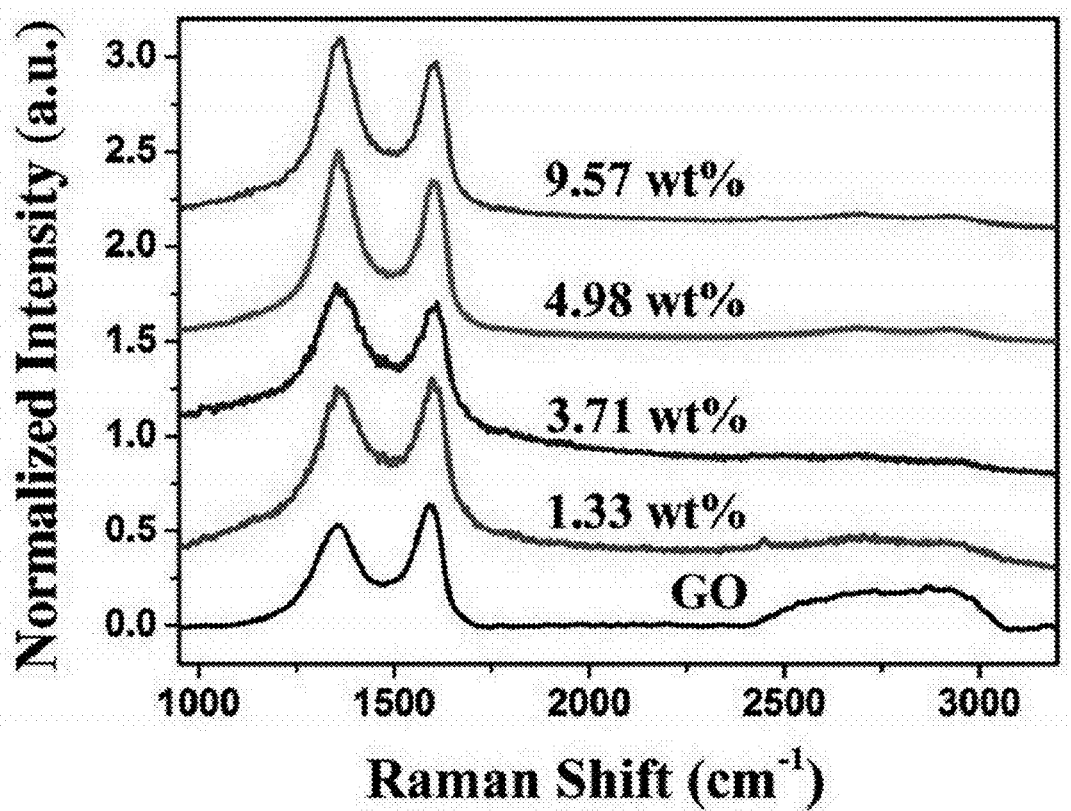
FIG. 2D illustrates Raman spectra of GO and rGO-AgNP.
Figure 2E:
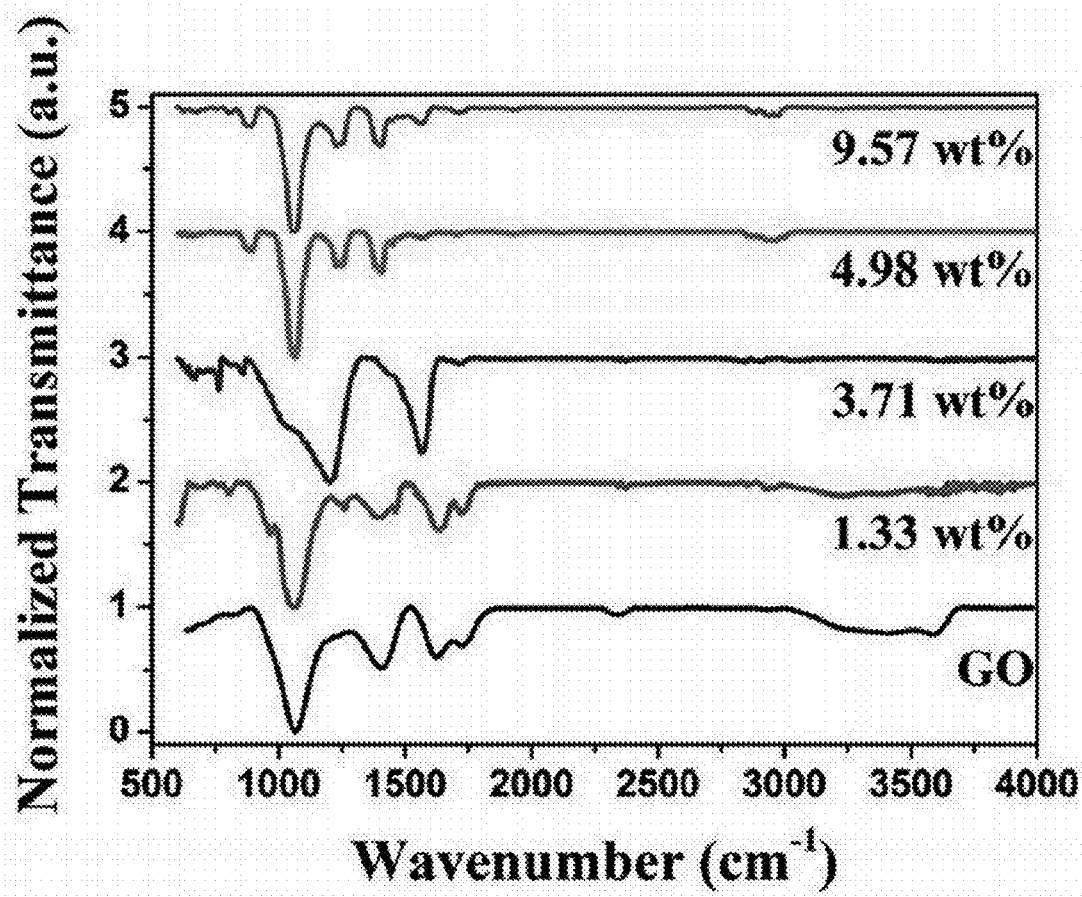
FIG. 2E illustrates FT-IR spectra of GO and rGO-AgNP.
Figure 3A:
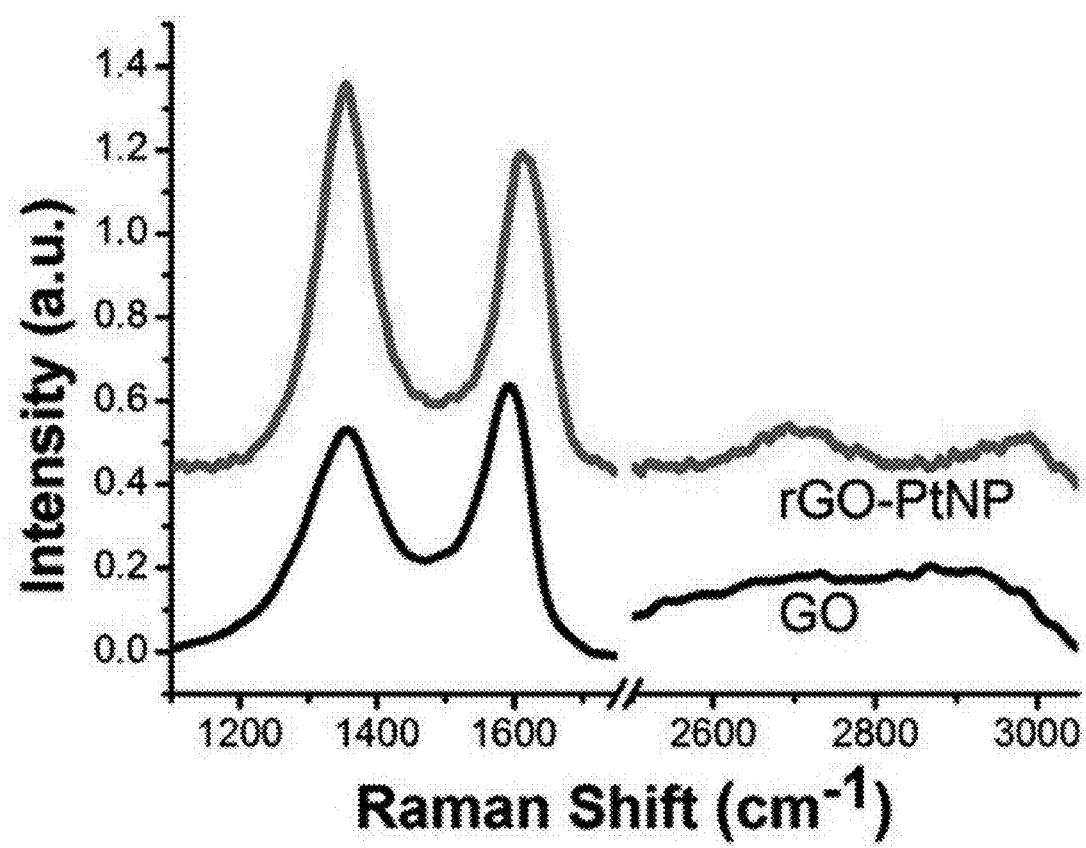
FIG. 3A illustrates Raman spectra of GO and a rGO-PtNP hybrid material in accordance with an Example of the present disclosure.
Figure 3B:
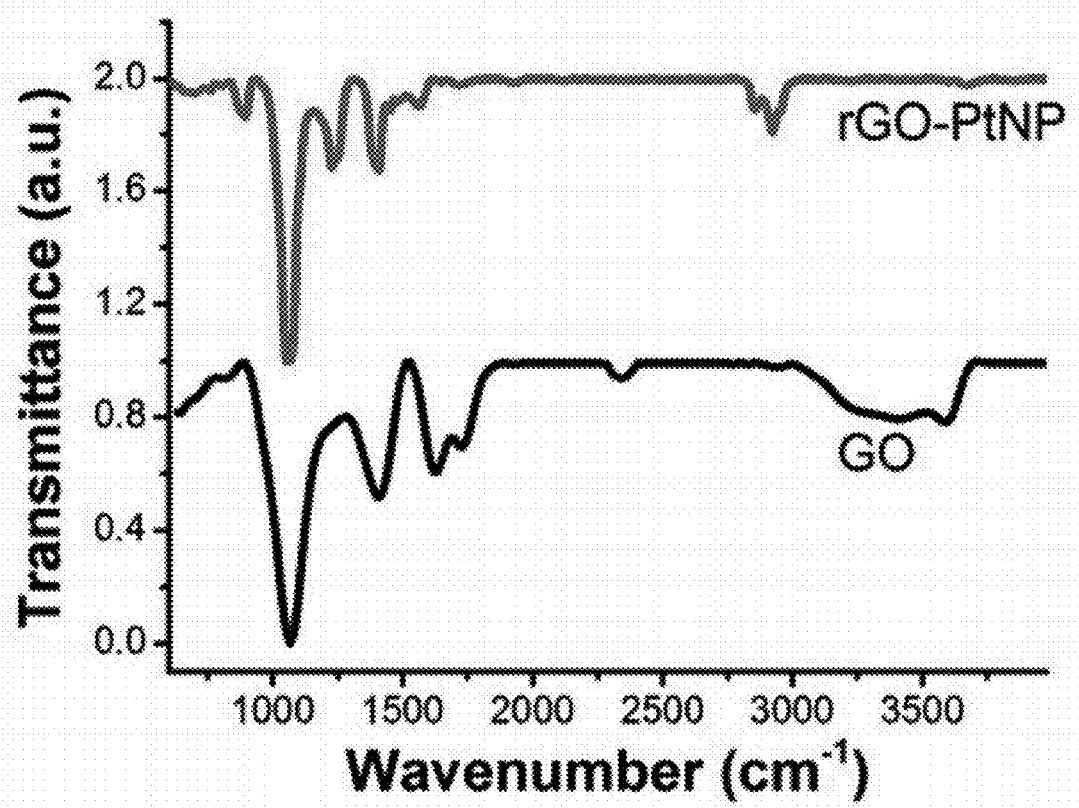
FIG. 3B illustrates FT-IR spectra of GO and a rGO-PtNP hybrid material in accordance with an Example of the present disclosure.

4. Characteristic Analysis (1) Reduction Degree of rGO-AgNP from GO/$AgNO_3$ Depending on Amount of $AgNO_3$ Ag and Pt on rGO were analyzed by X-ray diffraction (XRD). FIGS. 2A to 2C respectively illustrate XRD patterns of amounts of AgNP depending on rGO-AgNP and rGO-PtNP together with GO and graphite. A 2-θ peak of graphite powder was observed at 26.71°, which shows that an interlayer distance is 3.34 Å [FIG. 2C]. A 2-θ peak of the GO was observed at 10.27°, which shows that an interlayer distance is 8.60 Å [FIG. 2C]. Peaks at 38.1°, 44.3°, 64.5°, and 77.3° corresponded to the strongest reflection of crystallographic planes (111), (200), (220), and (311) of AgNP, respectively [FIG. 2A]. Peaks at 39.9°, 46.6°, 68.1°, and 81.7° corresponded to the strongest reflection of crystallographic planes (111), (200), (220), and (311) of PtNP, respectively [FIG. 2C]. FIG. 2B shows results enlarged from diffraction peaks of GO and rGO in FIG. 2A, and shows that GO starts to be reduced by more $AgNO_3$ and a diffraction peak of ~10° is shifted to ~24°. The XRD phenomenon has been well known as a reduction process of GO due to removal of an oxygen group. Further, as described above, $AgNO_3$ can serve as an initiator for reduction of GO. A peak at 24.1° belongs to (002) diffraction of rGO. Raman spectroscopy was used to additionally confirm an effect of the reaction in which a metal nanoparticle is prepared at the same time when GO is reduced. FIG. 2D illustrates Raman spectra of amounts of AgNP depending on GO powder and a rGO-AgNP hybrid material, and FIG. 3A illustrates Raman spectra of GO and rGO-PtNP. The Raman spectra of GO and metal nanoparticle-deposited rGO prepared by the above method were similar to each other. All of the spectra showed a D-band (caused by a defect), a G-band (caused by an optical change in a plane), a 2D-band (caused by scattering of two phonons), and 2,980 $cm^{-1}$ (S3-band) near a peak. However, by addition more $AgNO_3$, when an amount of AgNP increased, GO was considerably changed to AgNP at a ratio of $I_D/I_G$ of 9.57 wt %. On the rGO, $I_D/I_G$ of GO and AgNP of 1.33, 3.71, 4.98, and 9.57 wt % corresponded to 0.71, 1.12, 1.18, and 1.21, respectively and increased from 0.71 (GO) to 1.21 (9.57 wt %). This is because when a functionalized $sp^3$ hybridized C—C bond in GO was changed to $sp^2$ hybrid C—C double bond in rGO, disorder in a base plane of rGO increased, which means that as a de-oxygenation degree of GO increases, a quality of reduction from GO to rGO increases. Further, improved intensities of 2D and 3S peaks at 2,690 $cm^{-1}$ and 2,950 $cm^{-1}$ were results of advantageous reduction [FIG. 2D]. An infrared spectrophotometer (FT-IR) was used to inspect a reduction process. FIG. 2E illustrates FT-IR spectra of GO and rGO-AgNP hybrid materials with AgNP in different amounts. In the IR spectrum of GO, characteristic peaks were 3,409 $cm^{-1}$ (broad, O—H stretching), 2,948 $cm^{-1}$ (broad, $CH_2$ stretching), 1,728 $cm^{-1}$ (C=O stretching), 1,632 $cm^{-1}$ (C=C stretching), and 1,404 $cm^{-1}$ (O—H bond) [FIG. 2E]. It was clearly confirmed from the IR spectra that all of the rGO-AgNP materials did not show peaks at 1,404 $cm^{-1}$ or 13,409 $cm^{-1}$ and had very low intensities at 1.728 $cm^{-1}$, which shows that oxide groups present in GO were removed as much as possible. IR spectra of rGO-PtNP are shown in FIG. 3B and are clear evidence of in-situ reduction during a preparing process of a metal on GO. Thermogravimetric analysis (TGA) was used to additionally evaluate a reduction degree of a rGO-AgNP hybrid material. FIG. 2F is a TGA thermogram showing a loss of weight as an effect of a temperature on GO and AgNP in different amounts in a rGO-AgNP hybrid material under $N_2$ atmosphere. The GO showed a considerable loss of weight at an initiation temperature slightly higher than 100° C. as a result of removal of interlayer water, and then showed a loss of oxygen for itself at a slightly higher temperature. Interestingly, TGA stability of the rGO-AgNP hybrid material is rapidly improved since an amount of AgNO$_3$ initiator was increased due to more graphitization and de-oxygenation of the rGO-AgNP hybrid material by van der Waals forces enhanced between layers.

Figure 4A:
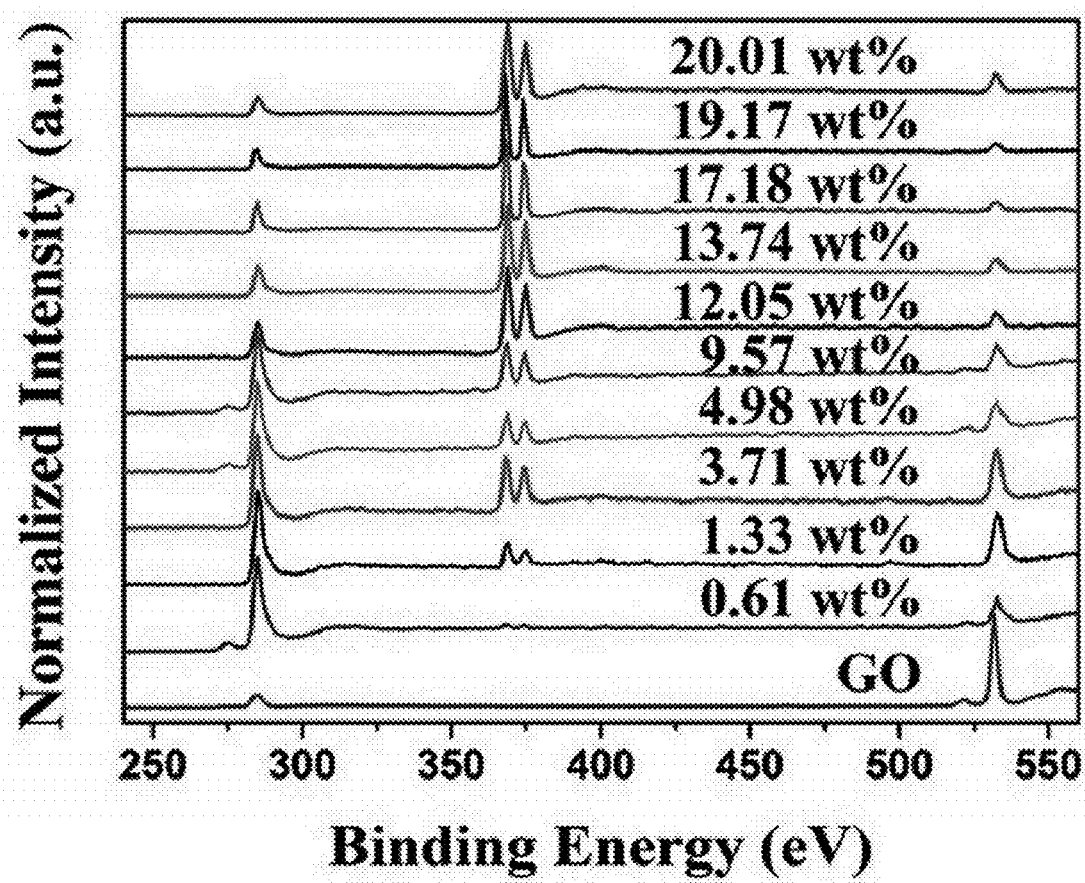
FIG. 4A illustrates XPS spectra of GO and rGO-AgNP hybrid materials in accordance with an Example of the present disclosure.
Figure 4B:
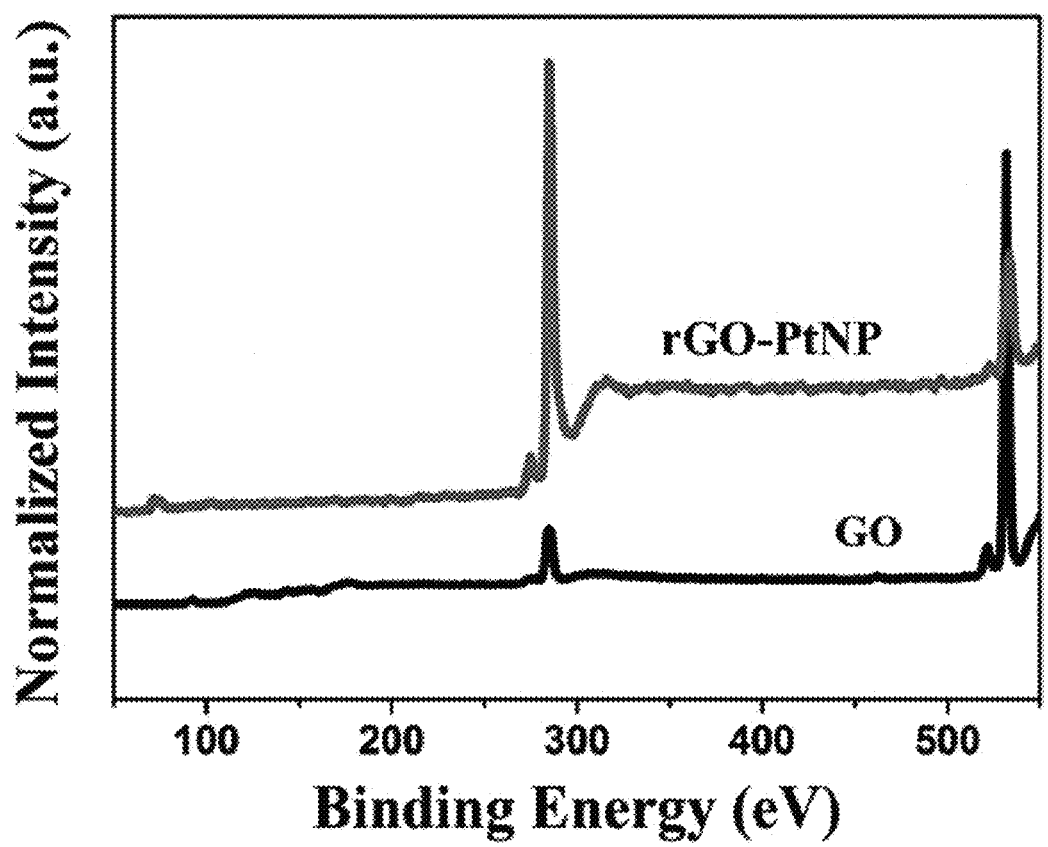
FIG. 4B illustrates XPS spectra of GO and rGO-PtNP in accordance with an Example of the present disclosure.
Figure 4C:
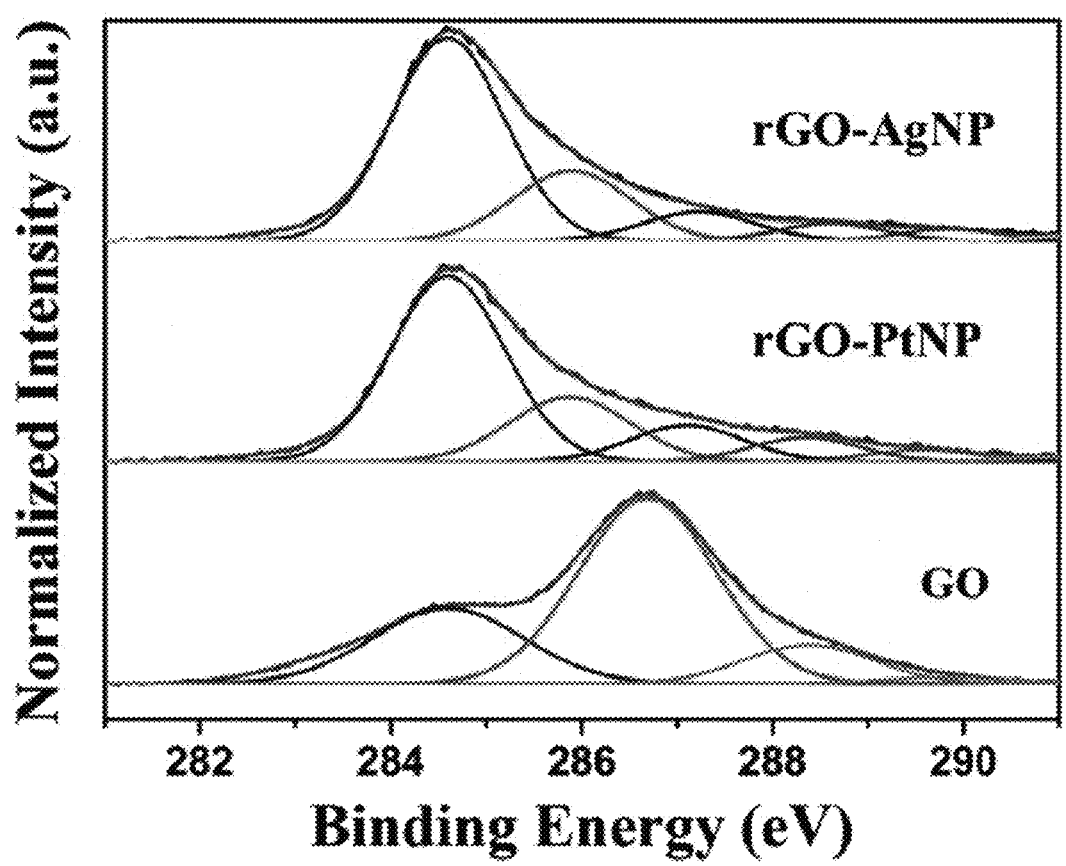
FIG. 4C illustrates Cis spectra of GO, rGO-AgNP, and rGO-PtNP in accordance with an Example of the present disclosure.
Figure 4D:
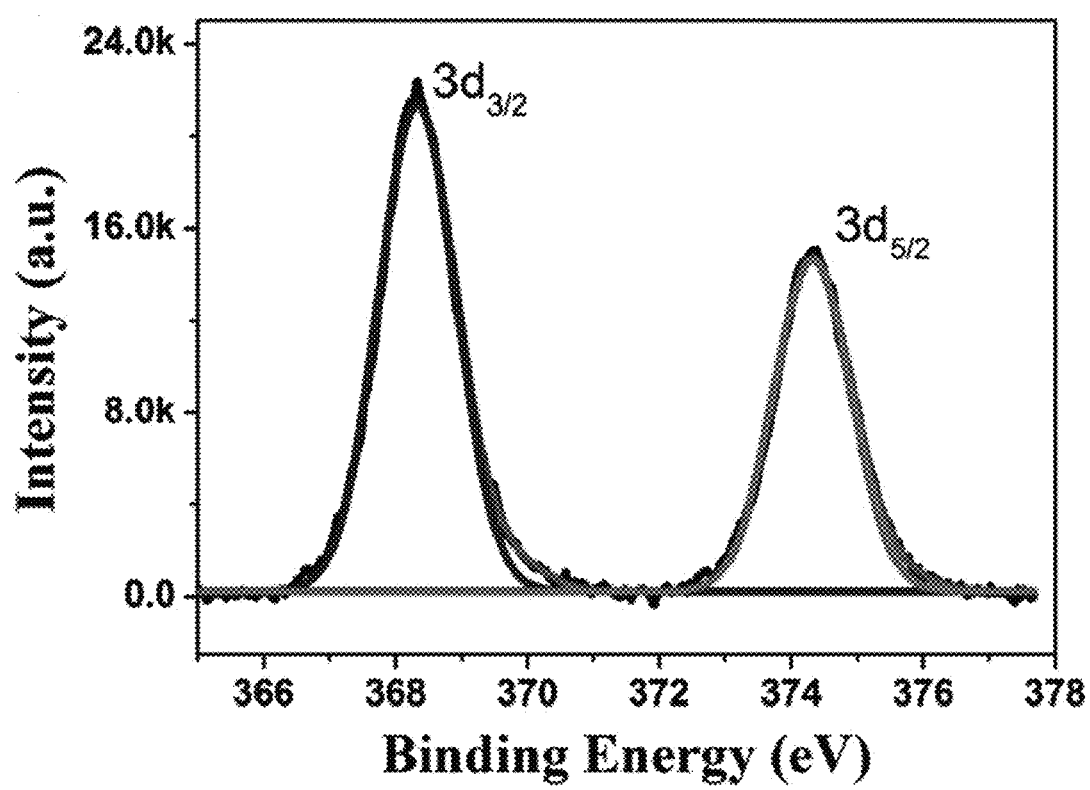
FIG. 4D illustrates silver (Ag) 3d XPS spectra of rGO-AgNP in accordance with an Example of the present disclosure.
Figure 4E:
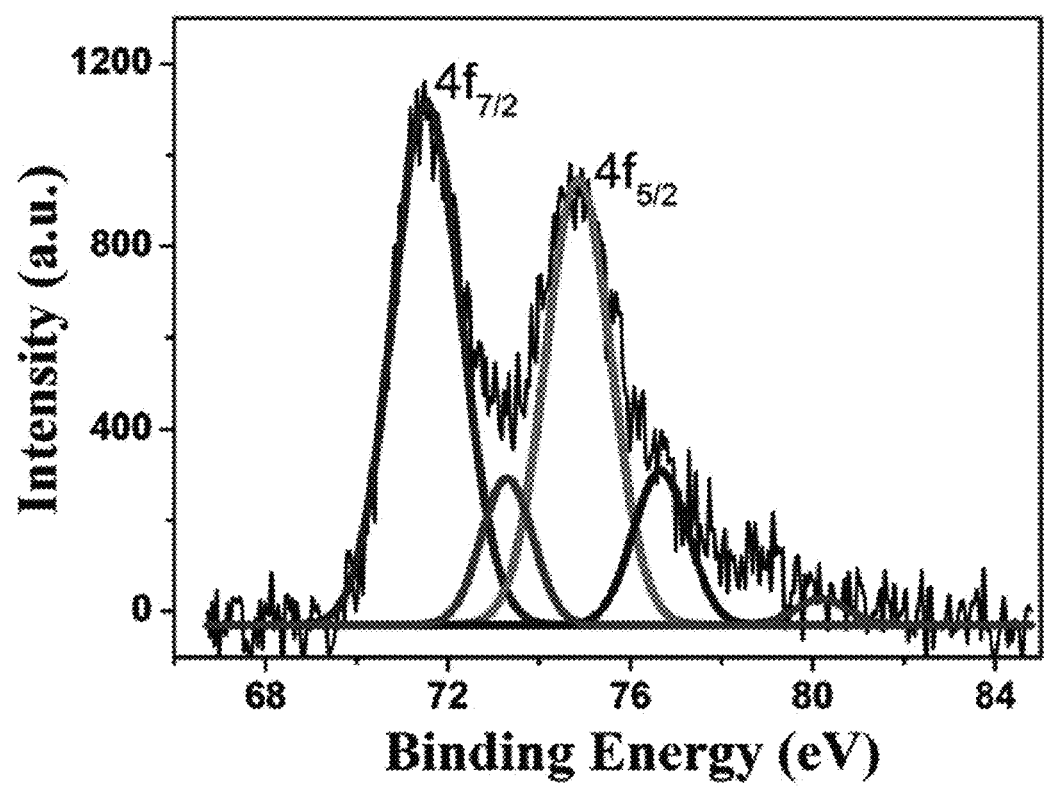
FIG. 4E illustrates platinum (Pt) 4f XPS spectra of rGO-PtNP in accordance with an Example of the present disclosure.
Figure 5A:
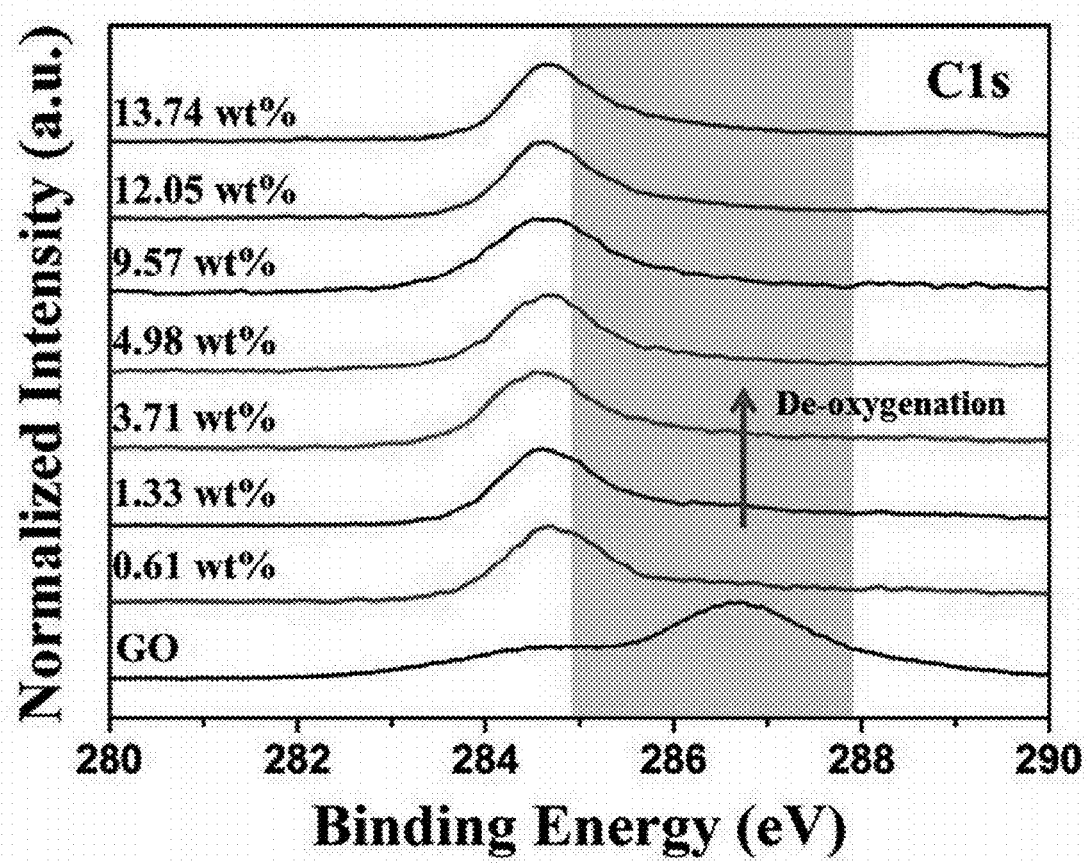
FIG. 5A illustrates high-resolution C1s XPS spectra of rGO-AgNP hybrid materials in accordance with an Example of the present disclosure.
Figure 5B:
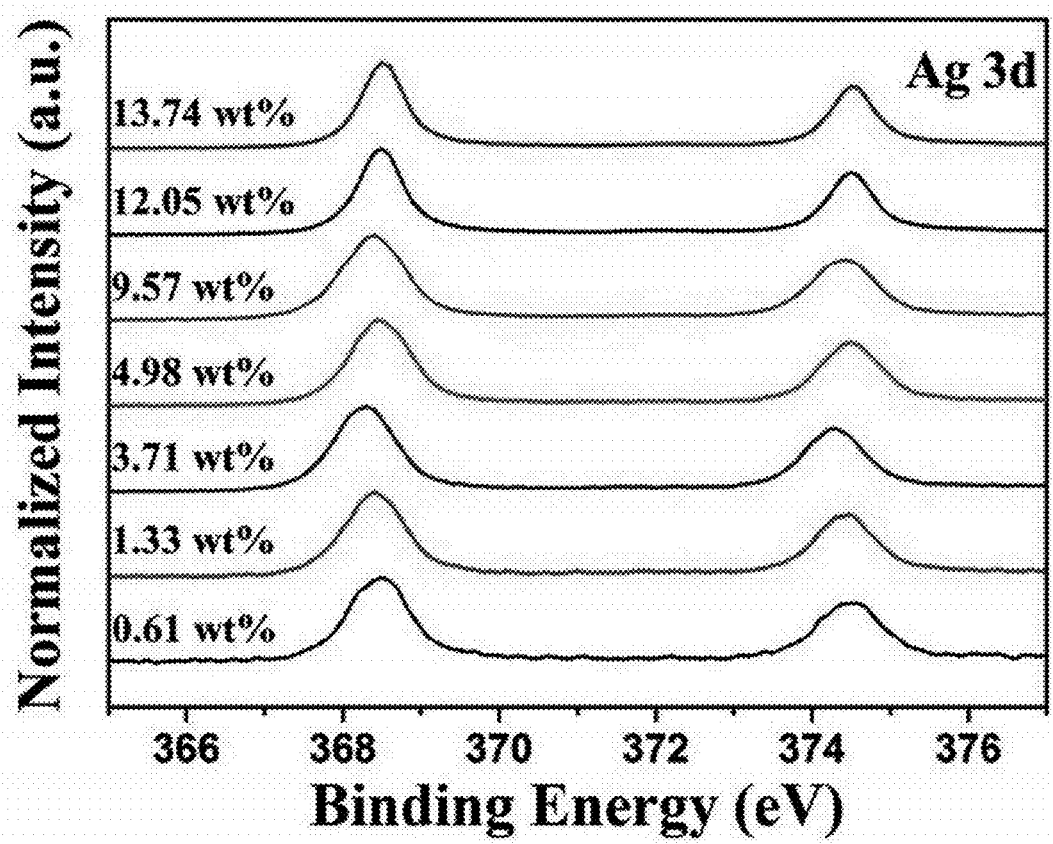
FIG. 5B illustrates high-resolution silver (Ag) 3d spectra of rGO-AgNP hybrid materials in accordance with an Example of the present disclosure.

Further, integration of metal nanoparticles in rGO was analyzed through X-ray photoelectron spectroscopy (XPS). FIG. 4A shows a comparison in XPS spectra of GO and rGO-AgNP hybrid materials with AgNP at various atomic weight ratios (0.61, 1.33, 3.71, 4.98, 9.57, 12.05, 13.74, 17.18, 19.17, and 20.01 wt %), and FIG. 4B shows a difference between GO and rGO-PtNP. FIG. 4C shows typical C1s spectra of GO, rGO-AgNP (1.33 wt % AgNP), and rGO-PtNP, and FIGS. 4D and 4E are silver (Ag) 3d XPS spectra of rGO-AgNP and platinum (Pt) 4f XPS spectra of rGO-PtNP, respectively. FIGS. 5A and 5B are respectively high-resolution C1s XPS spectra and silver (Ag) 3d spectra of rGO-AgNP hybrid materials with AgNP in different amounts. A clear silver 3d double peak was increased at 368.76 eV (silver 3d$_{5/2}$) and 374.79 eV (silver 3d$_{3/2}$) proving formation of AgNP from rGO [FIG. 4D and FIG. 5B]. As an amount of AgNP in the rGO-AgNP hybrid material was decreased, the oxygen functional group was actively decreased from 0.61 wt % AgNP, and the oxygen functional group was gradually decreased according to an increase in amount of AgNP to 20.01 wt % [FIG. 4C and FIG. 5], which is an effect of reduction.

Figure 6A:
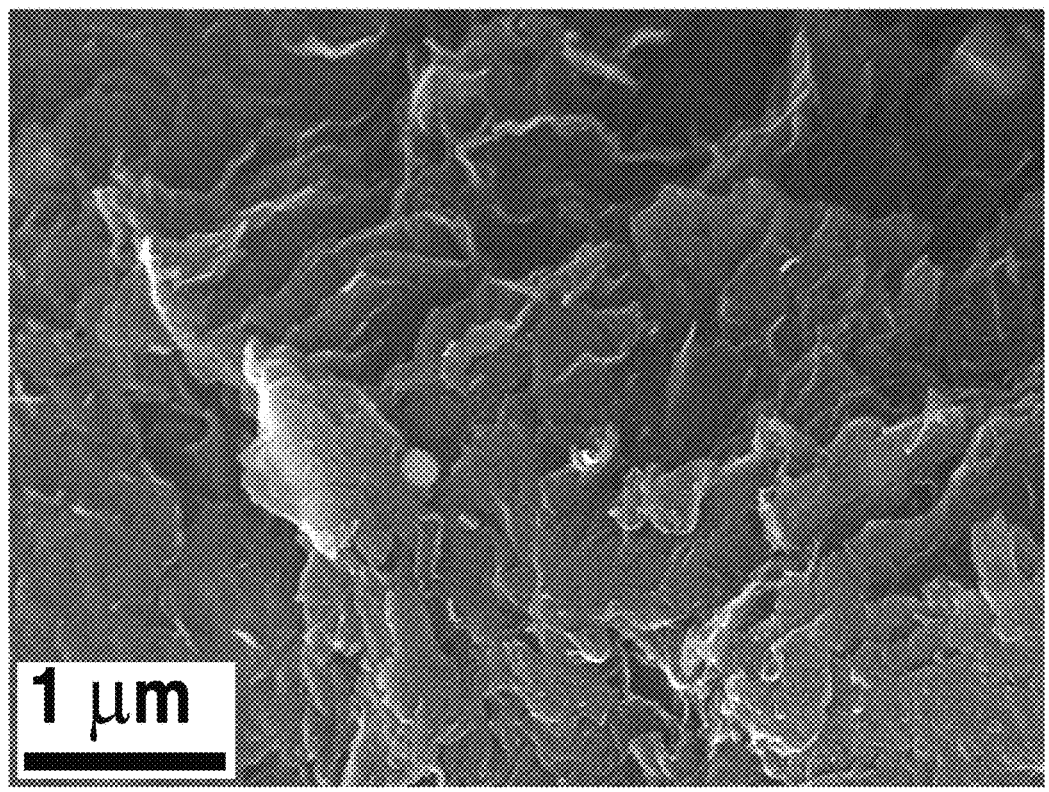
FIG. 6A provides a SEM image of rGO-AgNP in accordance with an Example of the present disclosure.
Figure 6B:
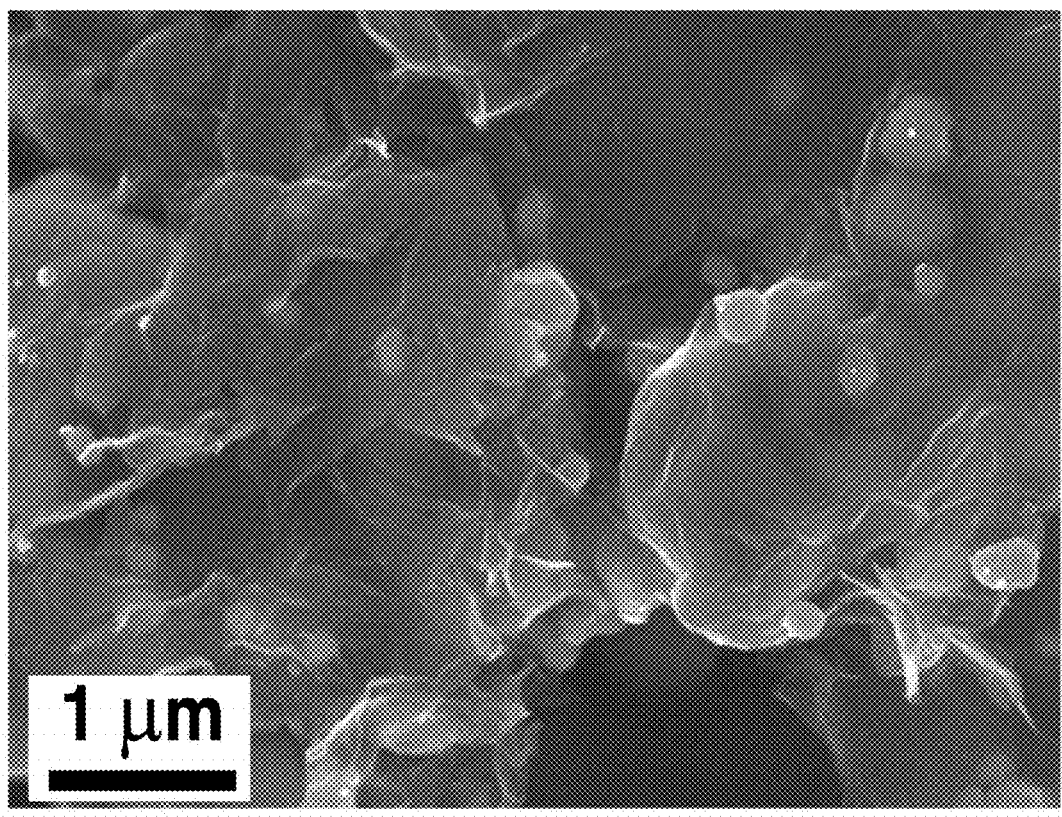
FIG. 6B provides a SEM image of rGO-PtNP in accordance with an Example of the present disclosure.
Figure 6C:
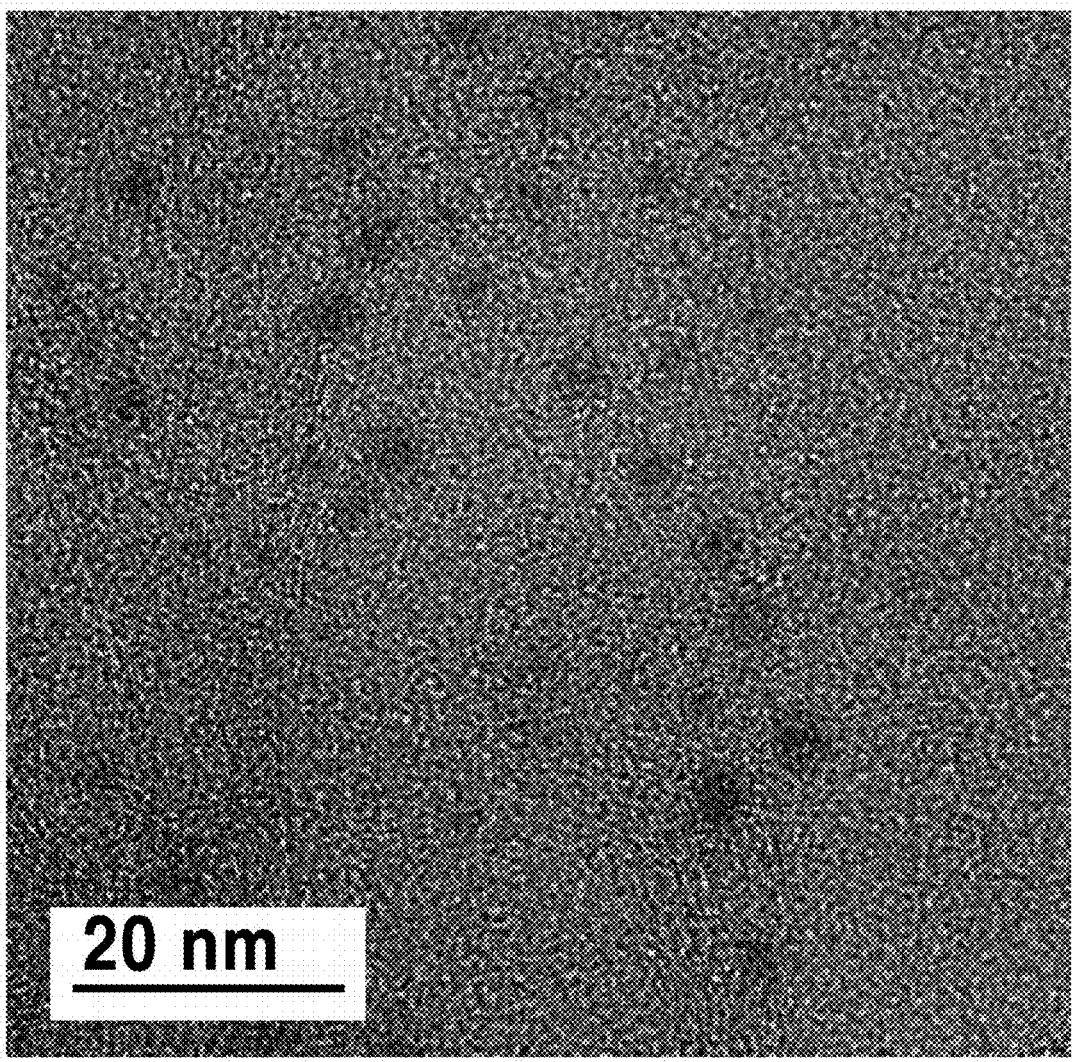
FIG. 6C provides a TEM image of rGO-AgNP in accordance with an Example of the present disclosure.
Figure 6D:
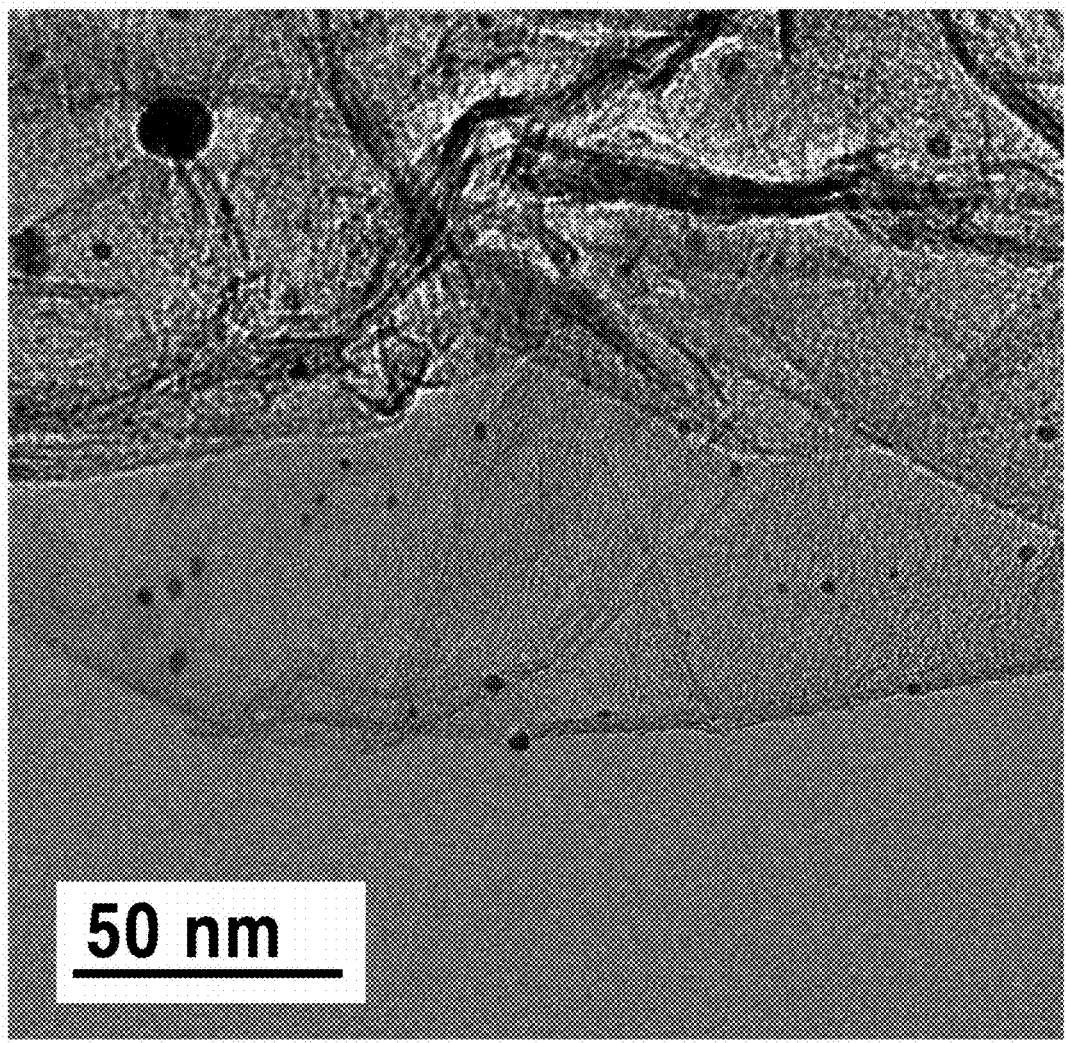
FIG. 6D provides a TEM image of rGO-PtNP in accordance with an Example of the present disclosure.
Figure 7:
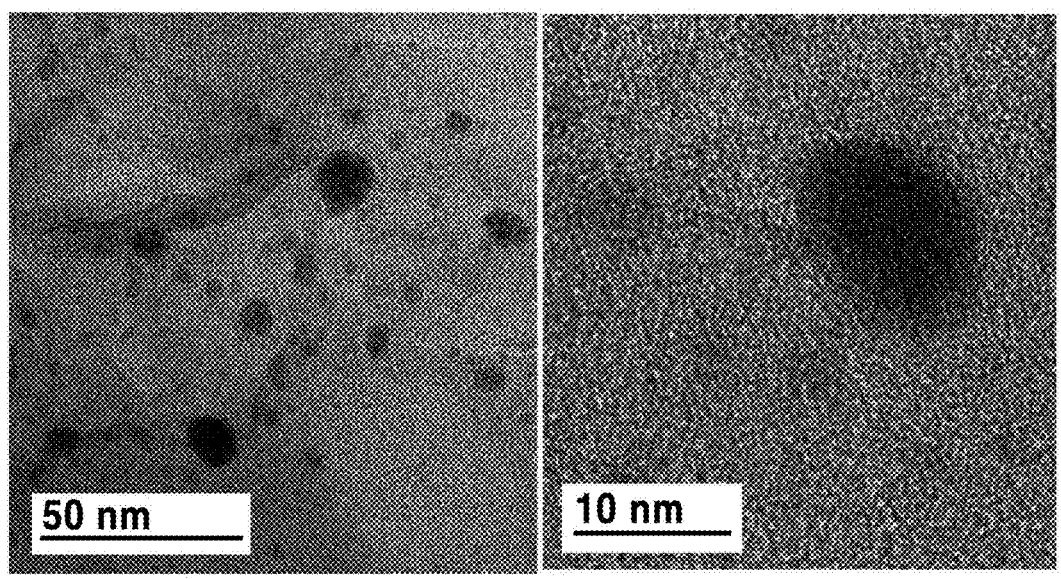
FIG. 7 provides TEM images of rGO-AgNP hybrid materials in accordance with an Example of the present disclosure.
Figure 8A:
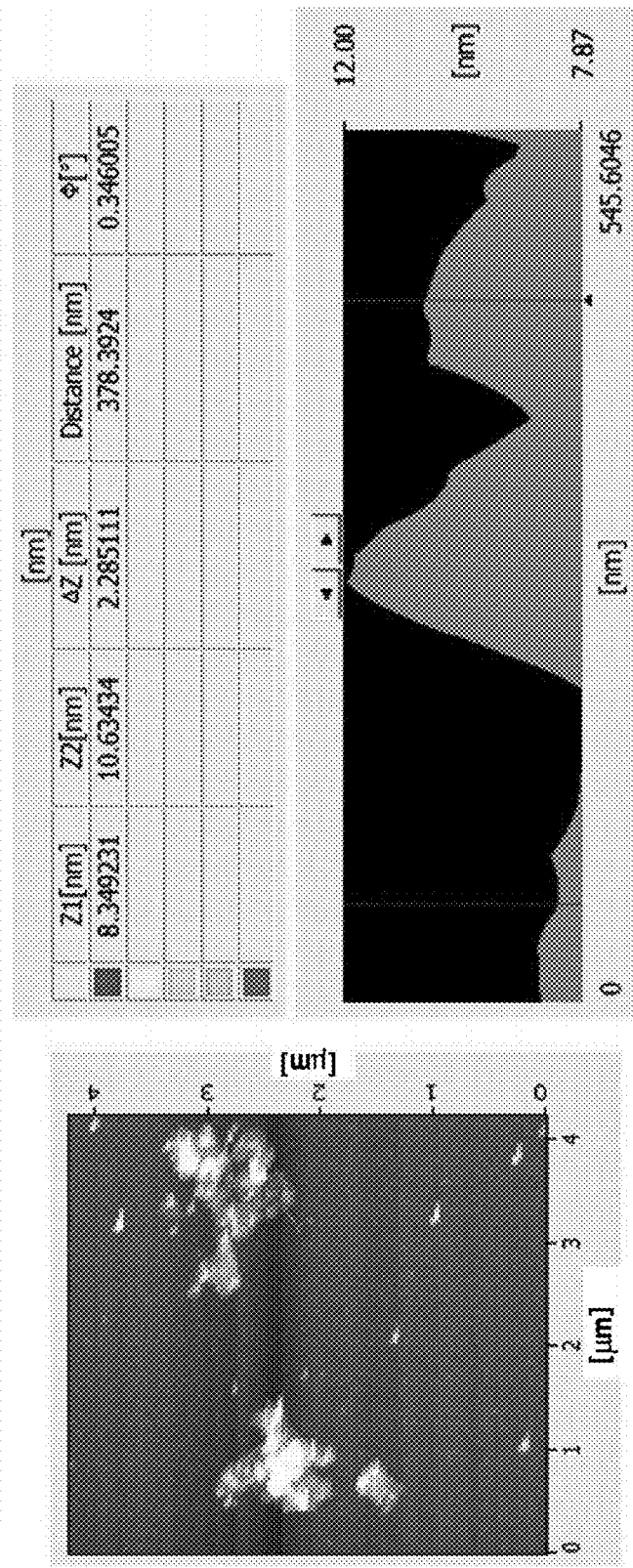
FIG. 8A provides an AFM image showing thicknesses of rGO-AgNP hybrid materials in accordance with an Example of the present disclosure.
Figure 8B:
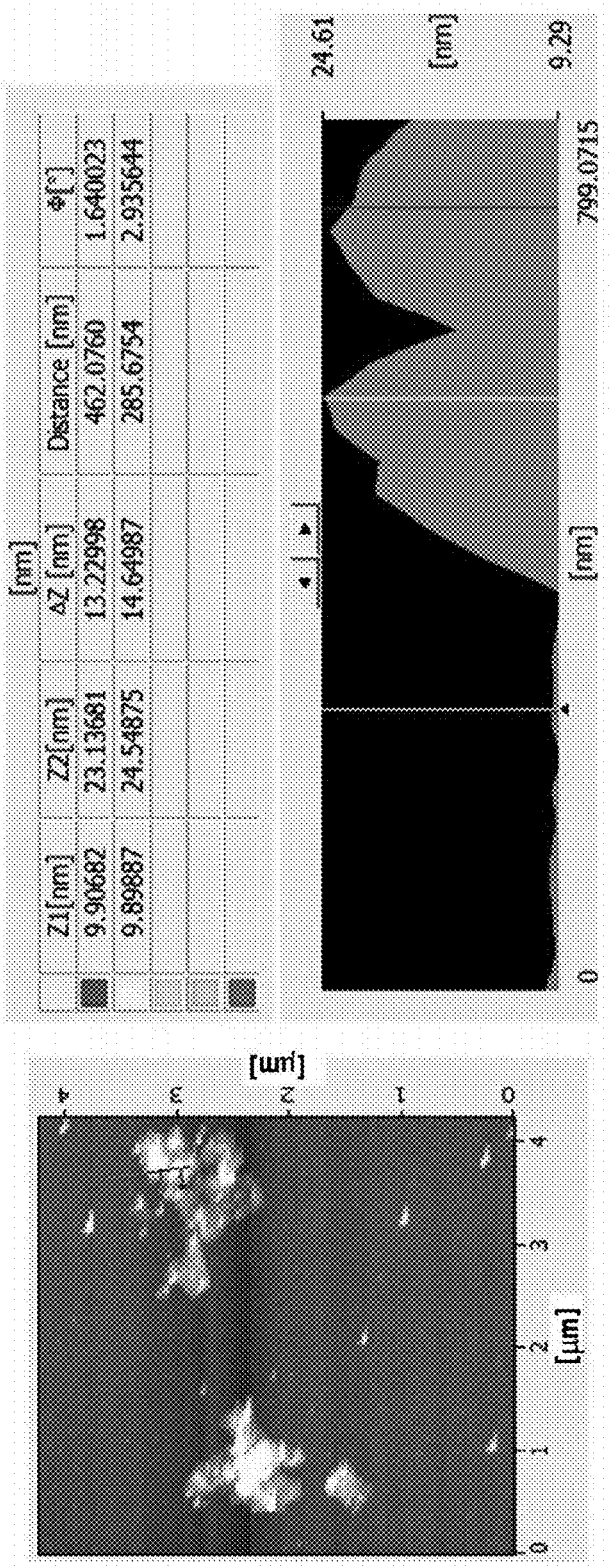
FIG. 8B provides an AFM image showing thicknesses of rGO-AgNP hybrid materials in accordance with an Example of the present disclosure.

Furthermore, a scanning electron microscope (SEM) and a transmission electron microscope (TEM) were used to check AgNP array on rGO and calculate sizes of nanoparticles deposited in rGO. FIGS. 6A and 6B are SEM images of rGO-AgNP and rGO-PtNP, respectively, and FIGS. 6C and 6D are TEM images of rGO-AgNP and rGO-PtNP, respectively. It was confirmed from the TEM images that the sizes of particles were from about 5 nm to about 15 nm. Further, AFM images in FIGS. 8A and 8B show uniform size distribution of metal nanoparticles.

Figure 9:
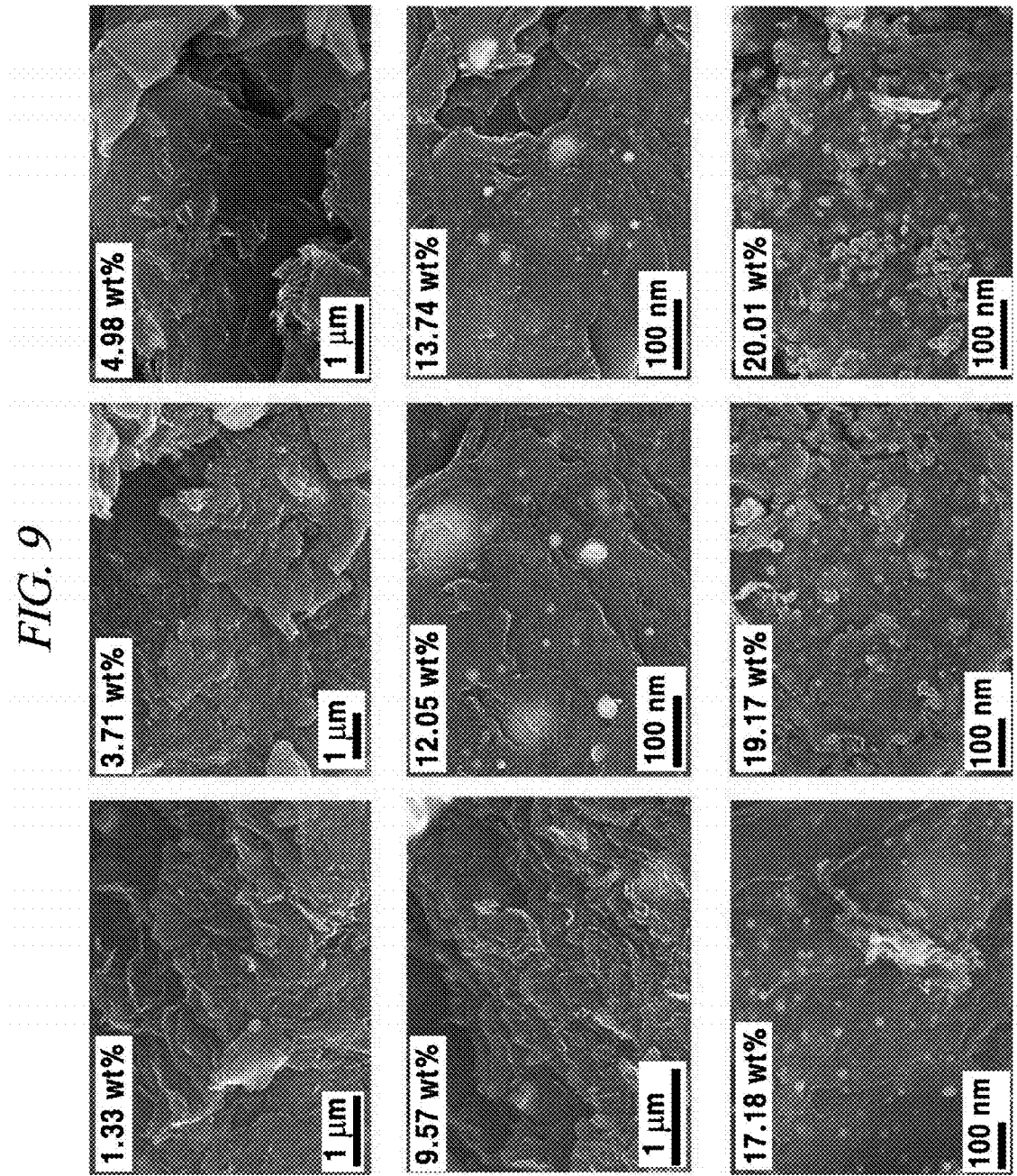
FIG. 9 provides SEM images of rGO-AgNP hybrid materials depending on an amount of AgNP in accordance with an Example of the present disclosure.

As shown in FIGS. 6A and 6B and FIG. 9, the SEM morphology of the composite prepared by the present disclosure clearly show that metal nanoparticles were deposited and immersed on rGO under the above-described reaction conditions. FIGS. 8A and 8B provide SEM images of rGO-AgNP hybrid materials with AgNP in various amounts and show that the morphology of AgNP on rGO gradually integrated according to an increase in amount of AgNP due to a dispersant-free reaction. This is a clear evidence of formation of a nanoparticle-rGO hybrid structure.

Figure 10:
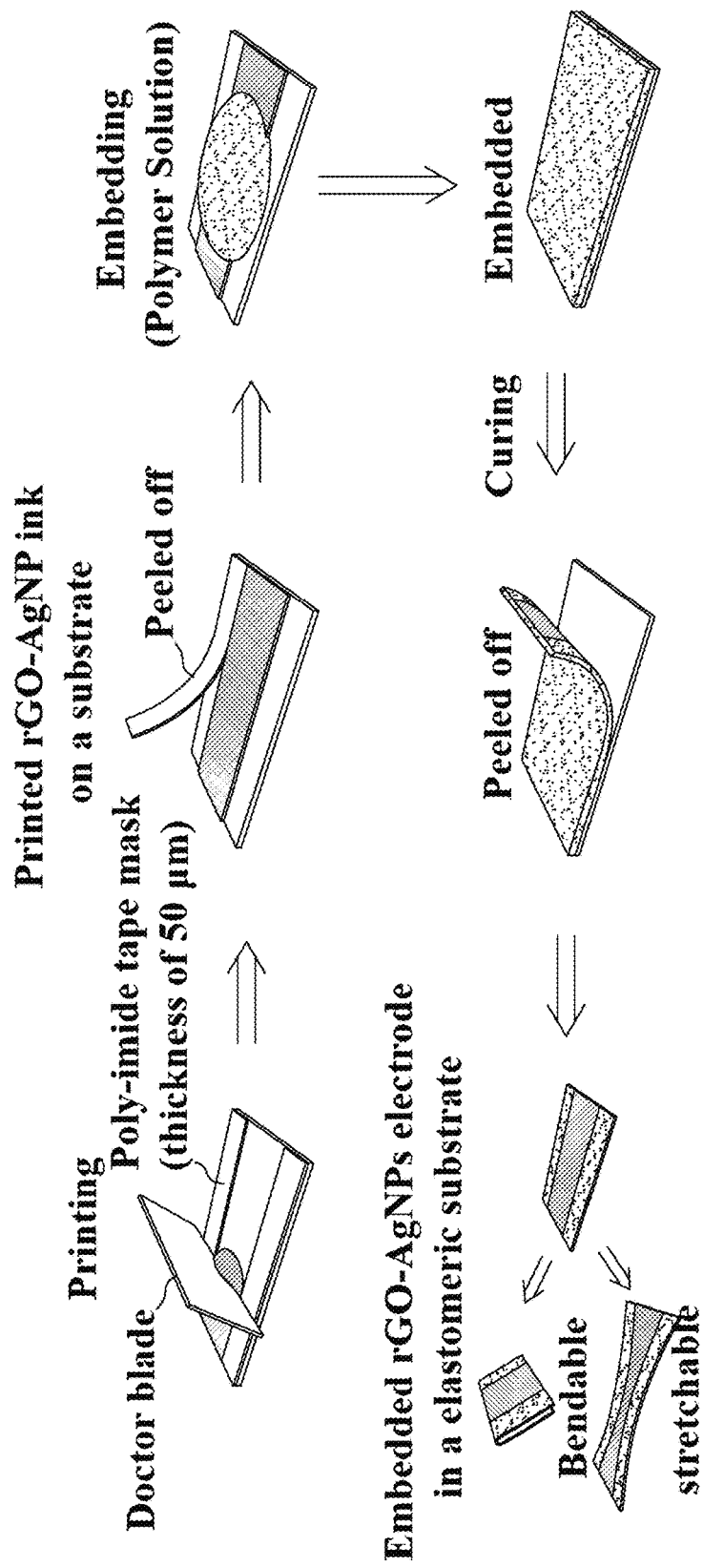
FIG. 10 is a schematic diagram illustrating a preparing process of a rGO-AgNP hybrid film in accordance with an Example of the present disclosure.
Figure 11:
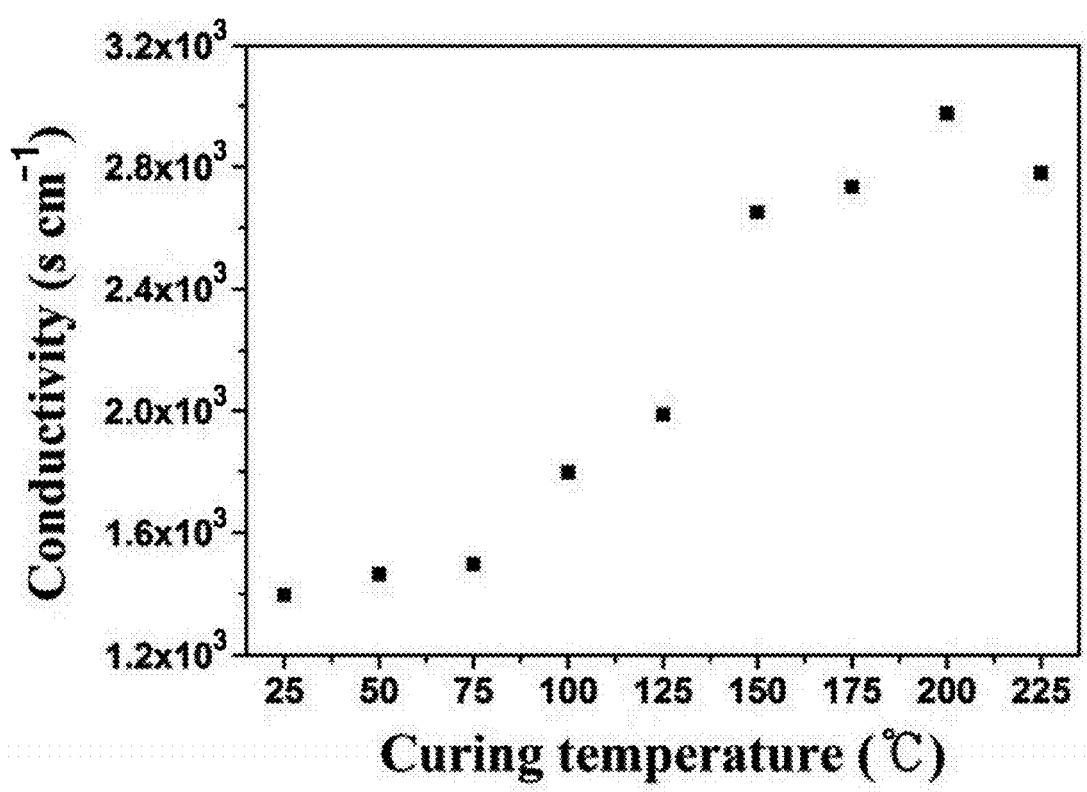
FIG. 11 is a graph showing a conductivity of a rGO-AgNP hybrid film depending on a hardening temperature in accordance with an Example of the present disclosure.

(2) Preparation of rGO-AgNP-Based Elastic Hybrid Film and Characteristic Thereof In order to prepare an elastic and conductive rGO-AgNP hybrid film, prepared rGO-AgNP powder was ground and then ultrasonicated in a polyvinylidene fluoride (PVDF) solution. A PVDF copolymer was selected as a matrix due to its excellent electrical and mechanical properties. The rGO-AgNP hybrid film having an average thickness of 30 μm was prepared on a PET or glass substrate by a doctor blade method, and then, deposited. Then, a chemical elastomer polymer solution such as nitrile butadiene rubber (NBR) was injected to the rGO-AgNP film. Finally, the rGO-AgNP hybrid film was dried and hardened at 150° C. by a hot-roll pressing process and then easily separated from the substrate (FIG. 10). Conductivity of the rGO-AgNP hybrid film was observed by an effect of a hardening temperature (FIG. 11). The conductivity was increased according to a decrease in hardening temperature caused by contraction of the polymer matrix.

FIG. 12A shows a conductivity of the rGO-AgNP hybrid film at a strain of 0% depending on a mass of AgNP. The other components had the fixed masses (100 mg of rGO, 10 wt % PVDF solution in 100 μL of NMP). When the mass of AgNP reached 9.0 wt %, the conductivity of the rGO-AgNP hybrid film increased. When the mass of AgNp was 20.01 wt % or more, the obtained film was fragile with phase separation. A bare AgNP film was not elastic and showed a relatively low conductivity. A theoretical estimation of the conductivity of the hybrid film was calculated using a power-law relation and 3D filtering. In brief, the power-law relation is as follows:

$$\sigma = \sigma_0 (V_f - V_c)s$$

Figure 12B:
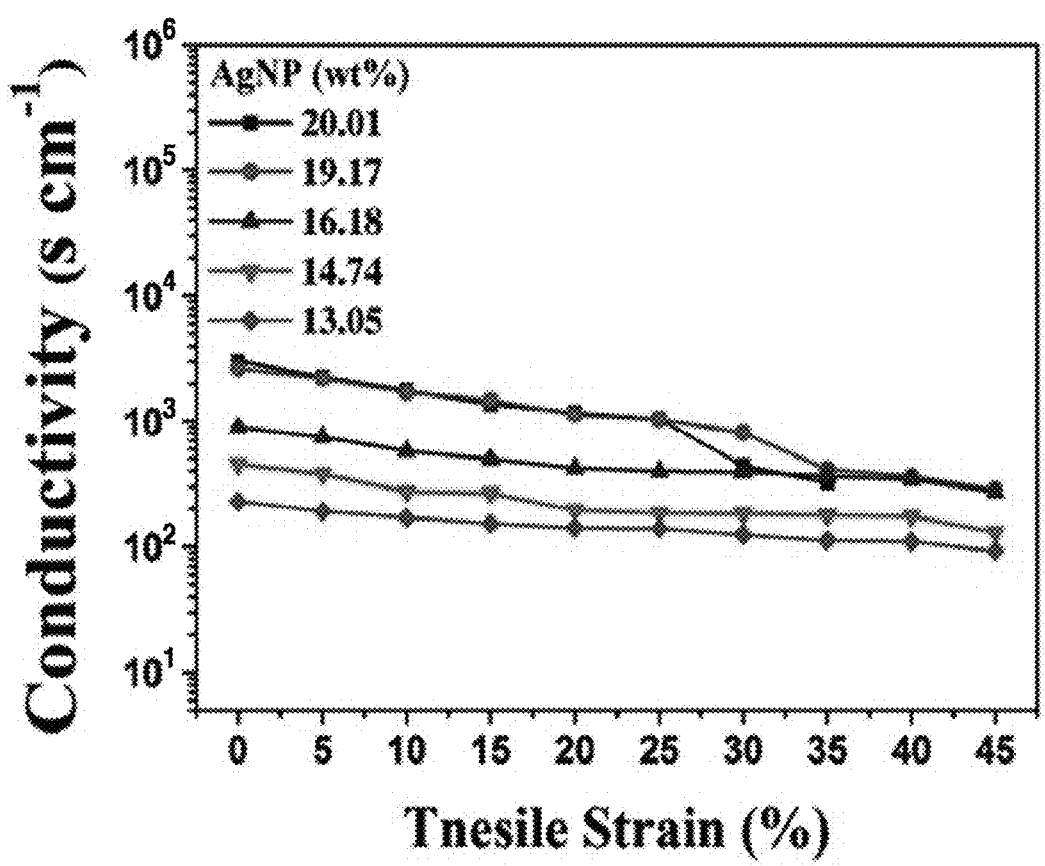
FIG. 12B shows a conductivity under tensile strain.
Figure 12D:
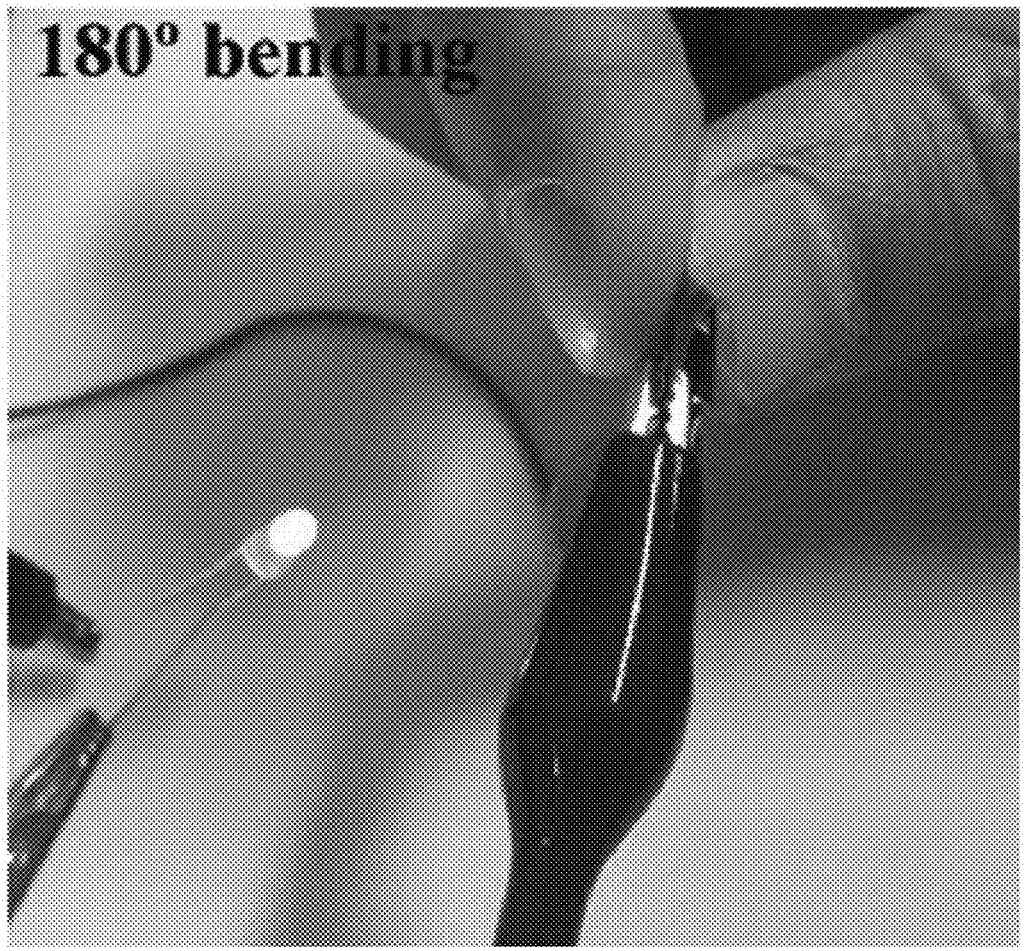
FIG. 12D provides an image showing a bending test.
Figure 12E:
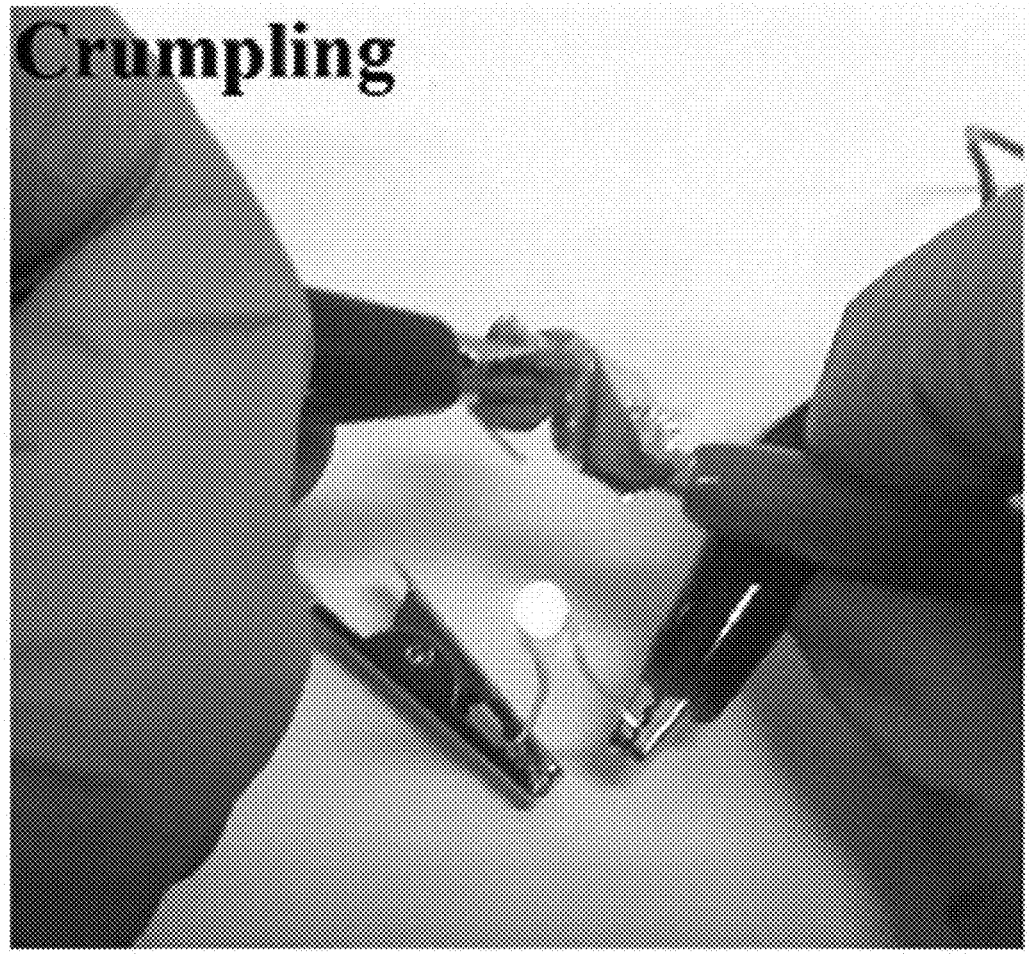
FIG. 12A shows a conductivity of a rGO-AgNP hybrid film.
FIG. 12C show a conductivity during a cycling test.
FIG. 12F provides images showing an operation test result of a LED chip to which rGO-AgNP hybrid films with different tensile strains are applied in accordance with an Example of the present disclosure.
Figure 12F:
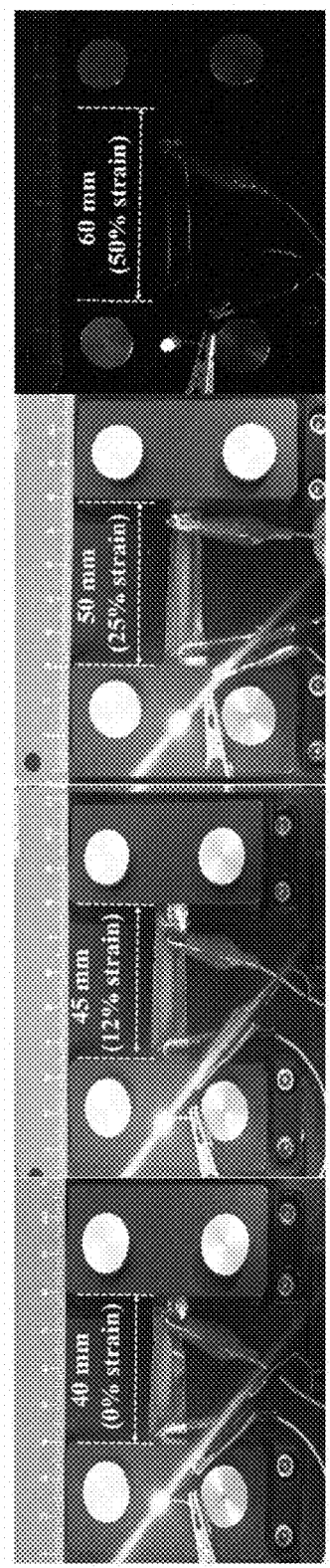

The a represents an electrical conductivity of the composite, the $\sigma_0$ represents a conductivity of a conductive filler, the $V_f$ represents a volume fraction of the filler, $V_c$ represents a volume fraction of a filtering reference point, and s represents a fitting exponent. AgNP was prepared in the form of nanoparticles irregularly dispersed in a certain direction, and the filtering reference point was calculated using an average inter-particle distance sample. The calculated filtering reference point (5.86 vol % after a drying process, which corresponds to 9.57 wt % in an initial compound) and the power-law relation were matched with the experimental result of the present disclosure. FIG. 12B shows conductivities of the rGO-AgNP hybrid film under various tensile strains using a 4-point probe system. The prepared hybrid film deposited in the chemical elastomer polymer showed the maximum conductivity of about 3,012 S/cm at a strain of 0%, and the conductivity of the rGO-AgNP hybrid film decreased as the strain increased. A conductivity of 322.8 S/cm was measured at a strain of 35%. A mass of the AgNP was not affected by flexibility, and all of the hybrid films were separated at a strain of 50%. A cycling test was performed for 4,000 cycles as shown in FIG. 12C. The conductivity was irregularly changed at first and stabilized after 1,500 cycles. Electrical performance of the rGO-AgNP hybrid film under various strains was visually checked using a green LED chip. Visual photographs of the LED chip before and after stretching (strains of 12%, 25%, and 50%) are shown in FIG. 12F. The LED was operated at about 3.0 V of bias applied due to an energy band gap of the LED. The brightness of the LED chip was decreased when the film was stretched since its tensile strain was increased (to 50%), which shows that a resistance was increased according to the increase in the tensile strain. The above-described result is shown in FIG. 12B. Further, even after a 180° bending test and a crumpling test of the rGO-AgNP hybrid film, the function of the rGO-AgNP hybrid film was maintained [FIGS. 12D and 12E].

Figure 13A:
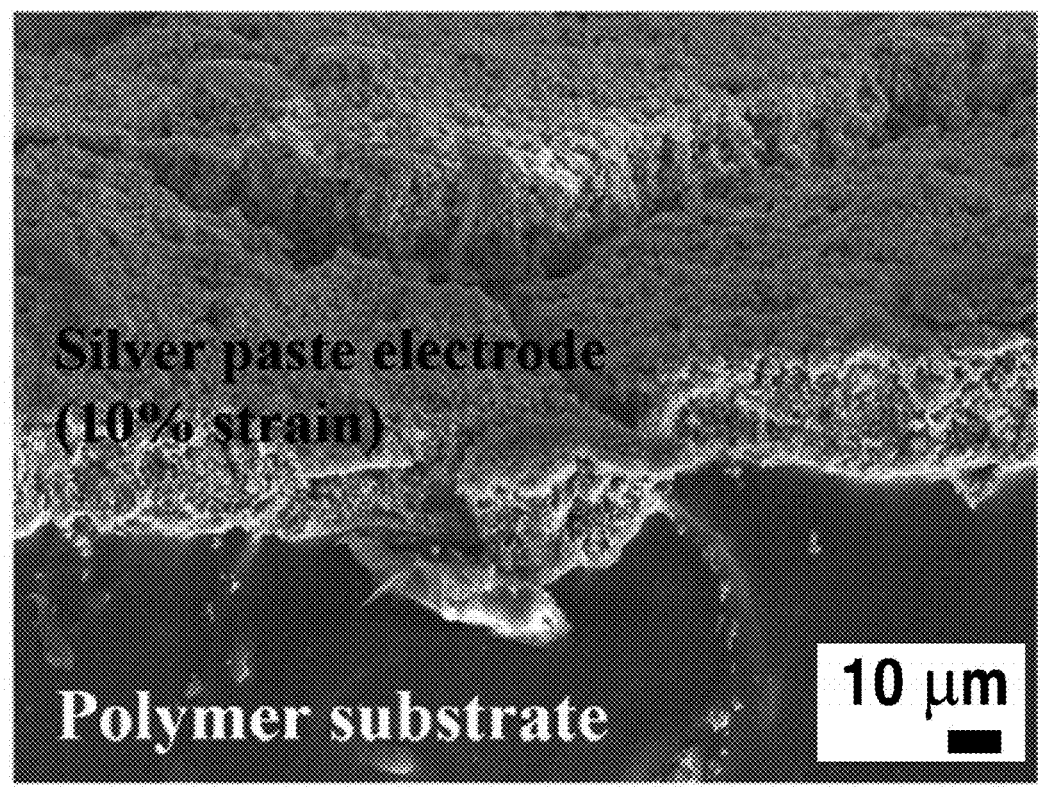
FIG. 13A provides a SEM image of a silver paste electrode measured with an increase in strain by 10% in accordance with an Example of the present disclosure.
Figure 13B:
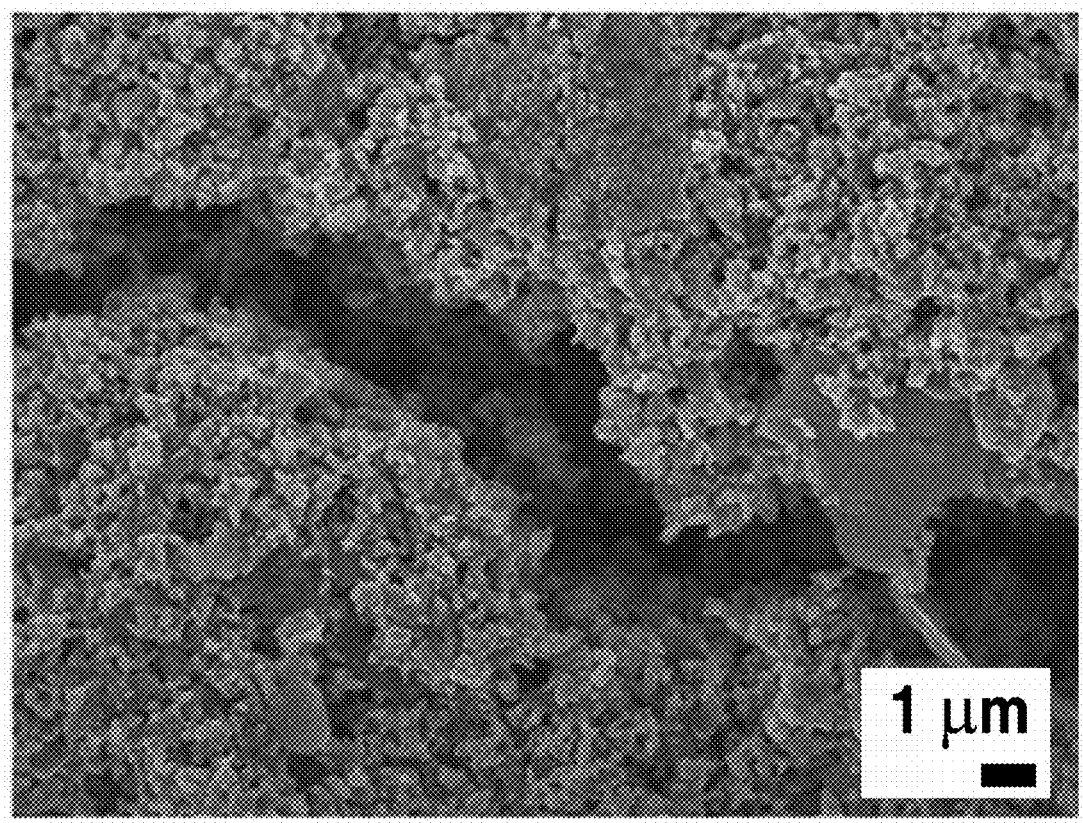
FIG. 13B provides a SEM image of a silver paste electrode measured with an increase in strain by 10% in accordance with an Example of the present disclosure.
Figure 13C:
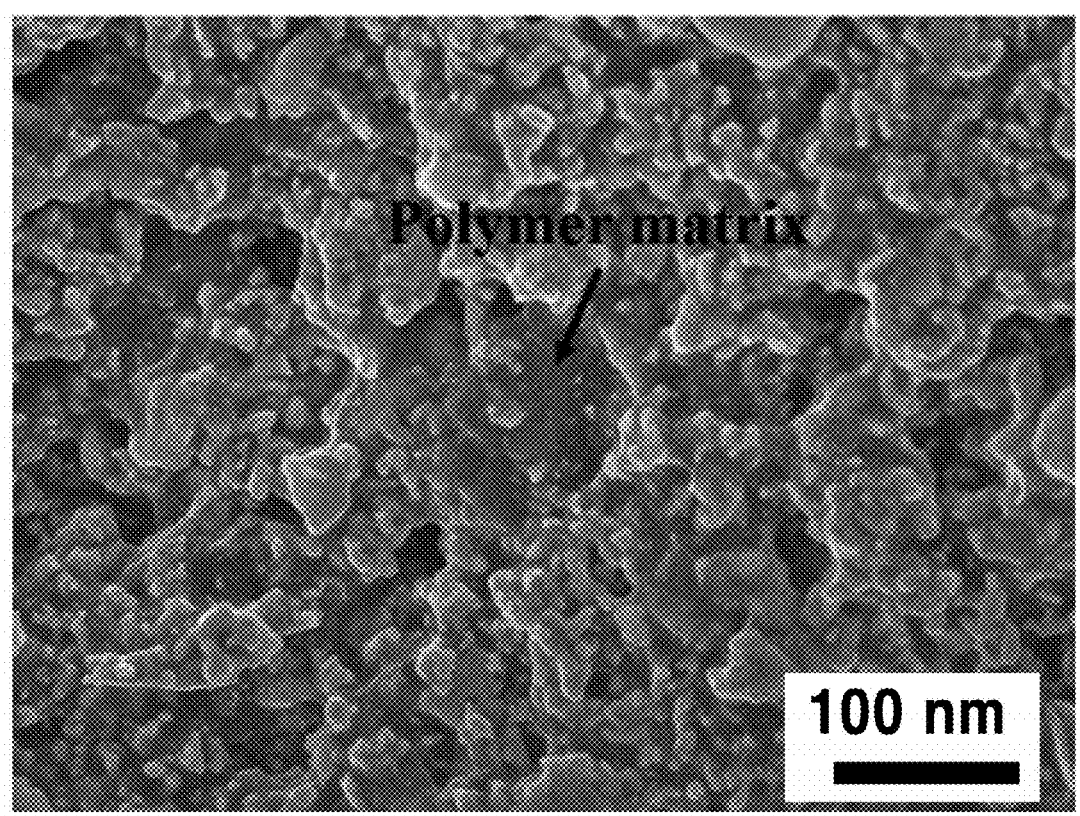
FIG. 13C provides a SEM image of a silver paste electrode measured with an increase in strain by 10% in accordance with an Example of the present disclosure.
Figure 13D:
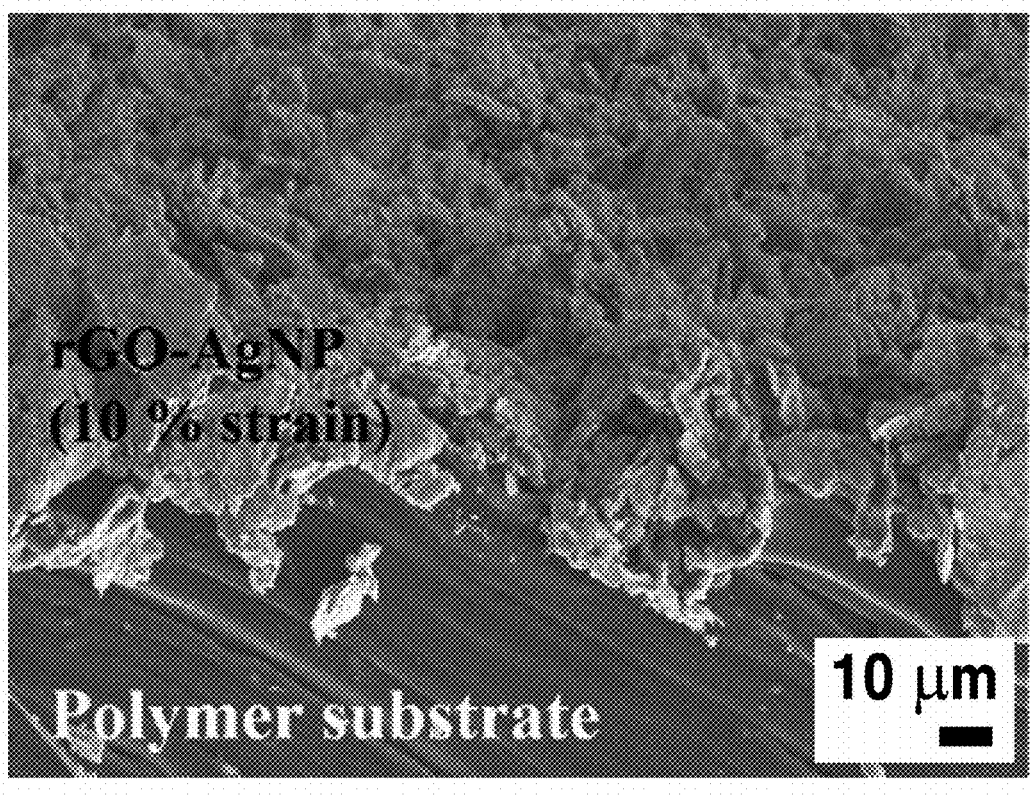
FIG. 13D provides a SEM image of a rGO-AgNP-immersed rGO measured with an increase in strain by 10% in accordance with an Example of the present disclosure.
Figure 13E:
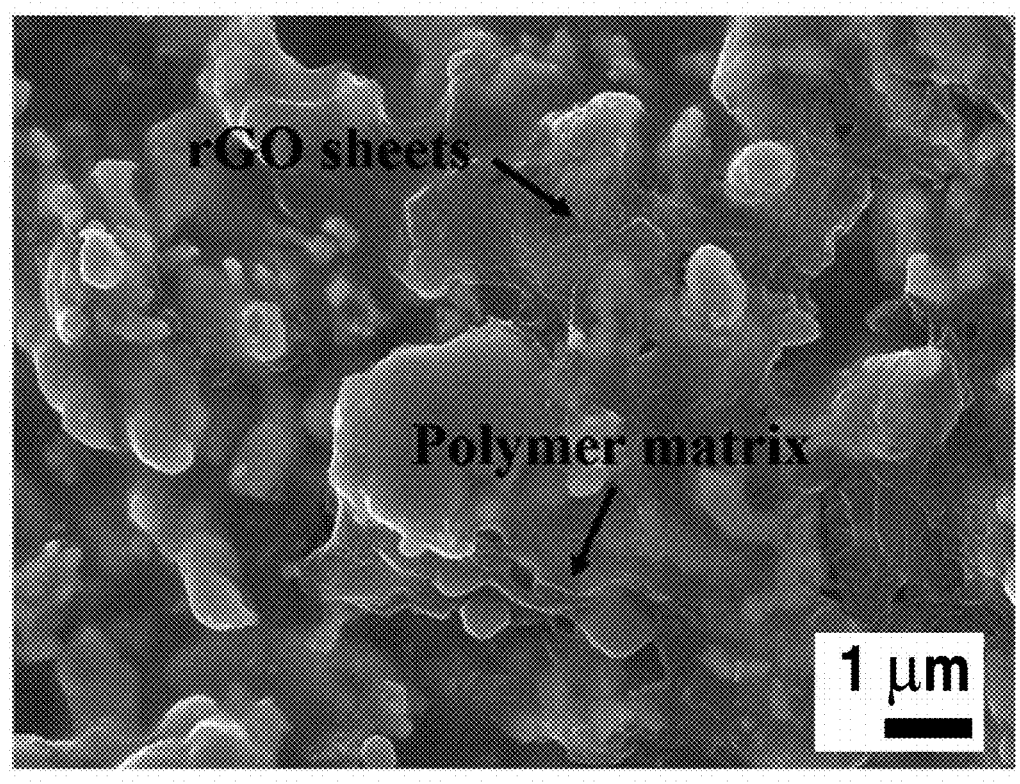
FIG. 13E provides a SEM image of a rGO-AgNP-immersed rGO measured with an increase in strain by 10% in accordance with an Example of the present disclosure.
Figure 13F:
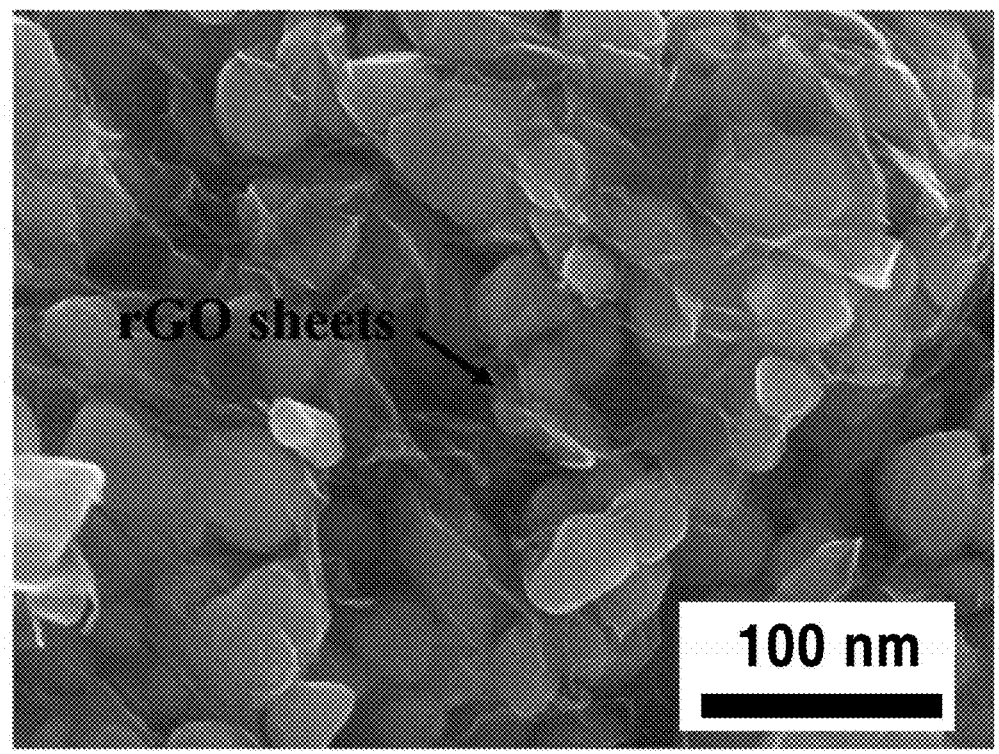
FIG. 13F provides a SEM image of a rGO-AgNP-immersed rGO measured with an increase in strain by 10% in accordance with an Example of the present disclosure.

In order to explain a mechanism available for elasticity of the rGO-AgNP hybrid film, the present researchers preformed SEM measurement for imaging the morphology at a strain of 10%. From the SEM images, the present disclosure could be compared with the morphology of a rGO-free silver paste electrode. FIGS. 13A and 13D show cross-sectional SEM images of a silver paste electrode on a chemical elastomer polymer substrate and AgNP-deposited rGO after strain at 10%, respectively. Although a surface morphology of the rGO-AgNP was shown as being rougher than the rGO-free silver paste electrode, a large crack occurred only at the silver paste electrode in the enlarged image [FIG. 13B]. This phenomenon was explained in FIGS. 13C and 13F. It was confirmed that in the rGO-free silver paste as shown in FIG. 13C, silver particles were separated from the chemical elastomer polymer as a non-conductive matrix and NBR. Meanwhile, a soft and flexible rGO sheet having a high aspect ratio can form an effective electrical network between AgNP, and the AgNP absorbed on a surface of the rGO sheet could improve a contact interface [FIG. 13F]. In short, although a silver paste electrode shows a dense morphology including the polymer matrix, the silver paste electrode is still hard and fragile by external strain. By contrast, the rGO-AgNP hybrid film clearly shows a morphology of a network electrically connected under a strain, and further endows a high elasticity.

In conclusion, the metal-containing graphene composite in accordance with the present disclosure provides a novel, convenient, and economical solution process for preparing metal nanoparticle-deposited rGO hybrid material using reduction duality of formic acid. Highly conductive and highly elastic electrodes having a high conductivity of 3,012 S/cm and 322.8 S/cm at a strain of 35% were prepared using a metal-immersion rGO ink which can be printed on a substrate provided with a high elasticity through an immersion process of a chemical elastomer polymer. In the composite containing an excess of silver (Ag), phase separation of AgNP was observed at a concentration of 20.01% or more, and, thus, long-term instability was confirmed. Such a wet and stable rGO-metal hybrid material can be applied to large-area electrical circuits, epidermal electronic devices, and wearable energy storage devices as charge collectors, and other modern nanoelectronics.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

The invention claimed is:

1. A method of preparing a metal-containing graphene hybrid composite, comprising:
   mixing an acid solution, a metal salt containing a metal ion, and graphene oxide to reduce the metal ion and the graphene oxide; and
   depositing the reduced metal ion on the reduced graphene oxide,
   wherein the acid solution comprises formic acid.

2. The method of claim 1,
   wherein the reduced metal ion is deposited in the form of metal nanoparticles on the reduced graphene oxide.

3. The method of claim 1,
   wherein a content of the metal nanoparticle in the composite is adjusted by adjusting a concentration of the metal salt.

4. The method of claim 1,
   wherein a reduction process of the acid solution is initiated by the metal salt.

5. The method of claim 1, wherein the mixing an acid solution, a metal salt containing a metal ion, and graphene oxide to reduce the metal ion and the graphene oxide is performed at a temperature of 80° C.

6. A method of preparing a metal-containing graphene hybrid composite, comprising:
   mixing an acid solution, a metal salt containing a metal ion, and graphene oxide to reduce the metal ion and the graphene oxide; and
   depositing the reduced metal ion on the reduced graphene oxide,
   wherein the acid solution comprises formic acid; and
   the metal salt and the graphene oxide are reduced at the same time.

7. The method of claim 6, wherein the reduced metal ion is deposited in the form of metal nanoparticles on the reduced graphene oxide.

8. The method of claim 1, further comprising heating after the depositing the reduced metal ion on the reduced graphene oxide.

* * * * *